US008864587B2

(12) United States Patent
Framel et al.

(10) Patent No.: US 8,864,587 B2
(45) Date of Patent: Oct. 21, 2014

(54) USER DEVICE POSITION INDICATION FOR SECURITY AND DISTRIBUTED RACE CHALLENGES

(71) Applicant: Sony Corporation, Tokyo (JP)

(72) Inventors: Julia Anne Framel, San Diego, CA (US); Aravind Babu Asam, San Diego, CA (US); Guru Prashanth Balasubramanian, San Diego, CA (US); Takeshi Suzuki, San Diego, CA (US); Charles D. Hedrick, Jr., Escondido, CA (US)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 13/644,044

(22) Filed: Oct. 3, 2012

(65) Prior Publication Data

US 2014/0094232 A1 Apr. 3, 2014

(51) Int. Cl.
*A63F 13/12* (2006.01)

(52) U.S. Cl.
USPC .................................................. 463/42

(58) Field of Classification Search
USPC ...................................... 463/39, 42; 434/247
See application file for complete search history.

(56) References Cited

U.S. PATENT DOCUMENTS

| | | |
|---|---|---|
| 4,278,095 A | 7/1981 | Lapeyre |
| 4,566,461 A | 1/1986 | Lubell et al. |
| 4,625,962 A | 12/1986 | Street |
| 4,708,337 A | 11/1987 | Shyu |
| 4,728,100 A | 3/1988 | Smith |
| 4,869,497 A | 9/1989 | Stewart et al. |
| 4,916,628 A | 4/1990 | Kugler |
| 4,920,969 A | 5/1990 | Suzuki et al. |
| 5,072,458 A | 12/1991 | Suzuki |
| 5,111,818 A | 5/1992 | Suzuki et al. |
| 5,207,621 A | 5/1993 | Koch et al. |
| 5,277,197 A | 1/1994 | Church et al. |
| 5,314,389 A | 5/1994 | Dotan |
| 5,410,472 A | 4/1995 | Anderson |
| 5,433,683 A | 7/1995 | Stevens |
| 5,454,770 A | 10/1995 | Stevens |
| 5,474,083 A | 12/1995 | Church et al. |

(Continued)

OTHER PUBLICATIONS

Sabrina Tai-Chen Yeh, David Andrew Young, "Altering Exercise Routes Based on Device Determined Information", file history of related U.S. Appl. No. 14/037,286, filed Sep. 25, 2013.

(Continued)

*Primary Examiner* — Omkar Deodhar
(74) *Attorney, Agent, or Firm* — John L. Rogitz; John M. Rogitz

(57) ABSTRACT

A mobile computing device includes a processor configured to receive position information from a position sensor and a display controlled by the processor. The device also includes a storage medium accessible to the processor and bearing instructions which, when executed by the processor, cause the processor to receive user input to challenge a friend's mobile device to an exercise, upload the challenge to a server, and receive a signal from the server indicating the challenge is accepted. The instructions cause the processor to upload to the server position information at a predetermined start time and receive from the server map information presenting a position of the mobile device and a position of the friend's mobile device. Further, the instructions cause the processor to receive updates of the map information including updates of the position of the mobile device and the position of the friend's mobile device periodically during the exercise.

11 Claims, 14 Drawing Sheets

(56) References Cited

U.S. PATENT DOCUMENTS

| | | |
|---|---|---|
| 5,474,090 A | 12/1995 | Begun et al. |
| 5,516,334 A | 5/1996 | Easton |
| 5,524,637 A | 6/1996 | Erickson |
| 5,579,777 A | 12/1996 | Suga |
| 5,598,849 A | 2/1997 | Browne |
| 5,704,067 A | 1/1998 | Brady |
| 5,706,822 A | 1/1998 | Khavari |
| 5,857,939 A | 1/1999 | Kaufman |
| 5,921,891 A | 7/1999 | Browne |
| 6,013,007 A | 1/2000 | Root et al. |
| 6,032,108 A | 2/2000 | Seiple et al. |
| 6,042,519 A | 3/2000 | Shea |
| 6,050,924 A | 4/2000 | Shea |
| 6,106,297 A | 8/2000 | Pollak et al. |
| 6,171,218 B1 | 1/2001 | Shea |
| 6,198,431 B1 * | 3/2001 | Gibson .................... 342/357.57 |
| 6,220,865 B1 | 4/2001 | Macri et al. |
| 6,244,988 B1 | 6/2001 | Delman |
| 6,251,048 B1 | 6/2001 | Kaufman |
| 6,259,944 B1 | 7/2001 | Margulis et al. |
| 6,296,595 B1 | 10/2001 | Stark et al. |
| 6,447,425 B1 | 9/2002 | Keller et al. |
| 6,464,618 B1 | 10/2002 | Shea |
| 6,497,638 B1 | 12/2002 | Shea |
| 6,500,100 B1 | 12/2002 | Harrell |
| 6,515,593 B1 | 2/2003 | Stark et al. |
| 6,582,342 B2 | 6/2003 | Kaufman |
| 6,601,016 B1 | 7/2003 | Brown et al. |
| 6,605,044 B2 | 8/2003 | Bimbaum |
| 6,638,198 B1 | 10/2003 | Shea |
| 6,659,916 B1 | 12/2003 | Shea |
| 6,659,946 B1 | 12/2003 | Batchelor et al. |
| 6,672,991 B2 | 1/2004 | O'Malley |
| 6,702,719 B1 | 3/2004 | Brown et al. |
| 6,746,371 B1 | 6/2004 | Brown et al. |
| 6,749,537 B1 | 6/2004 | Hickman |
| 6,786,848 B2 | 9/2004 | Yamashita et al. |
| 6,793,607 B2 | 9/2004 | Neil |
| 6,863,641 B1 | 3/2005 | Brown et al. |
| 6,866,613 B1 | 3/2005 | Brown et al. |
| 6,882,883 B2 | 4/2005 | Condie et al. |
| 6,997,882 B1 | 2/2006 | Parker et al. |
| 7,024,369 B1 | 4/2006 | Brown et al. |
| 7,056,265 B1 | 6/2006 | Shea |
| 7,057,551 B1 | 6/2006 | Vogt |
| 7,070,539 B2 | 7/2006 | Brown et al. |
| 7,128,693 B2 | 10/2006 | Brown et al. |
| 7,192,401 B2 | 3/2007 | Salaasti et al. |
| 7,223,215 B2 | 5/2007 | Bastyr |
| 7,245,254 B1 | 7/2007 | Vogt |
| 7,328,612 B2 | 2/2008 | Jämsen et al. |
| 7,351,187 B2 | 4/2008 | Seliber |
| 7,370,763 B1 | 5/2008 | Pascucci |
| 7,376,423 B2 * | 5/2008 | Sakanaba .................... 455/435.1 |
| 7,438,670 B2 | 10/2008 | Gray et al. |
| 7,507,183 B2 | 3/2009 | Anderson et al. |
| 7,586,418 B2 | 9/2009 | Cuddihy et al. |
| 7,617,615 B1 | 11/2009 | Martorell et al. |
| 7,664,292 B2 | 2/2010 | van den Bergen et al. |
| 7,683,252 B2 | 3/2010 | Oliver et al. |
| 7,699,752 B1 | 4/2010 | Anderson et al. |
| 7,728,214 B2 | 6/2010 | Oliver et al. |
| 7,786,856 B2 | 8/2010 | O'Brien |
| 7,840,031 B2 | 11/2010 | Albertson et al. |
| 7,841,966 B2 | 11/2010 | Aaron et al. |
| 7,857,730 B2 | 12/2010 | Dugan |
| 7,931,563 B2 | 4/2011 | Shaw et al. |
| 7,951,046 B1 | 5/2011 | Barber, Jr. |
| 7,966,230 B2 | 6/2011 | Brown |
| 7,979,136 B2 | 7/2011 | Young et al. |
| 7,996,080 B1 | 8/2011 | Hartman et al. |
| 8,021,270 B2 | 9/2011 | D'eredita |
| 8,029,410 B2 | 10/2011 | Shea |
| 8,047,965 B2 | 11/2011 | Shea |
| 8,057,360 B2 | 11/2011 | Shea |
| 8,062,182 B2 | 11/2011 | Somers |
| 8,092,346 B2 | 1/2012 | Shea |
| 8,103,762 B2 | 1/2012 | Duberry |
| 8,109,858 B2 | 2/2012 | Redmann |
| 8,157,730 B2 | 4/2012 | LeBoeuf et al. |
| 8,162,802 B2 | 4/2012 | Berg |
| 8,182,424 B2 | 5/2012 | Heckerman |
| 8,204,786 B2 | 6/2012 | LeBoeuf et al. |
| 8,219,191 B1 | 7/2012 | Hartman et al. |
| 8,277,377 B2 | 10/2012 | Quy |
| 8,333,874 B2 | 12/2012 | Currie |
| 8,343,012 B2 | 1/2013 | Redmann |
| 8,360,785 B2 | 1/2013 | Park et al. |
| 8,360,935 B2 | 1/2013 | Olsen et al. |
| 8,371,990 B2 | 2/2013 | Shea |
| 8,435,177 B2 | 5/2013 | Lanfermann et al. |
| 8,452,413 B2 | 5/2013 | Young et al. |
| 8,491,446 B2 | 7/2013 | Hinds et al. |
| 8,512,209 B2 | 8/2013 | Guidi et al. |
| 8,512,548 B2 | 8/2013 | Bar-or et al. |
| 8,514,067 B2 | 8/2013 | Hyde et al. |
| 2001/0020143 A1 | 9/2001 | Stark et al. |
| 2002/0028730 A1 | 3/2002 | Kaufman |
| 2002/0072932 A1 | 6/2002 | Swamy |
| 2002/0142887 A1 | 10/2002 | O'Malley |
| 2002/0156392 A1 | 10/2002 | Arai et al. |
| 2003/0028116 A1 | 2/2003 | Bimbaum |
| 2003/0064860 A1 | 4/2003 | Yamashita et al. |
| 2003/0171188 A1 | 9/2003 | Neil |
| 2003/0171189 A1 | 9/2003 | Kaufman |
| 2004/0058908 A1 | 3/2004 | Keller et al. |
| 2004/0077462 A1 | 4/2004 | Brown et al. |
| 2004/0117214 A1 | 6/2004 | Shea |
| 2005/0070809 A1 | 3/2005 | Acres |
| 2005/0075214 A1 | 4/2005 | Brown et al. |
| 2005/0163346 A1 | 7/2005 | van den Bergen et al. |
| 2005/0177059 A1 | 8/2005 | Koivumaa et al. |
| 2005/0209002 A1 | 9/2005 | Blythe et al. |
| 2005/0233861 A1 | 10/2005 | Hickman et al. |
| 2005/0272561 A1 | 12/2005 | Cammerata |
| 2006/0025282 A1 | 2/2006 | Redmann |
| 2006/0032315 A1 | 2/2006 | Saalastic et al. |
| 2006/0094570 A1 | 5/2006 | Schneider |
| 2006/0111944 A1 | 5/2006 | Sirmans, Jr. et al. |
| 2006/0240959 A1 | 10/2006 | Huang |
| 2006/0252602 A1 | 11/2006 | Brown et al. |
| 2006/0281976 A1 | 12/2006 | Juang et al. |
| 2006/0288846 A1 | 12/2006 | Logan |
| 2007/0042868 A1 | 2/2007 | Fisher et al. |
| 2007/0083092 A1 | 4/2007 | Rippo et al. |
| 2007/0083095 A1 | 4/2007 | Rippo et al. |
| 2007/0113725 A1 | 5/2007 | Oliver et al. |
| 2007/0113726 A1 | 5/2007 | Oliver et al. |
| 2007/0173377 A1 | 7/2007 | Jamsen et al. |
| 2007/0213608 A1 | 9/2007 | Brown |
| 2007/0219059 A1 | 9/2007 | Schwartz et al. |
| 2007/0249467 A1 | 10/2007 | Hong et al. |
| 2007/0249468 A1 | 10/2007 | Chen |
| 2007/0275825 A1 | 11/2007 | O'Brien |
| 2008/0045384 A1 | 2/2008 | Matsubara et al. |
| 2008/0051919 A1 | 2/2008 | Sakai et al. |
| 2008/0098876 A1 | 5/2008 | Kuo et al. |
| 2008/0103022 A1 | 5/2008 | Dvorak et al. |
| 2008/0146890 A1 | 6/2008 | Leboeuf et al. |
| 2008/0146892 A1 | 6/2008 | LeBoeuf et al. |
| 2008/0147502 A1 | 6/2008 | Baker |
| 2008/0162186 A1 | 7/2008 | Jones |
| 2008/0170123 A1 | 7/2008 | Albertson et al. |
| 2008/0176713 A1 | 7/2008 | Olivera |
| 2008/0182723 A1 | 7/2008 | Aaron et al. |
| 2008/0204225 A1 | 8/2008 | Kitchen |
| 2008/0220941 A1 | 9/2008 | Shaw et al. |
| 2008/0262918 A1 | 10/2008 | Wiener |
| 2009/0044687 A1 | 2/2009 | Sorber |
| 2009/0105047 A1 | 4/2009 | Guidi et al. |
| 2009/0131224 A1 | 5/2009 | Yuen |
| 2009/0138488 A1 | 5/2009 | Shea |
| 2009/0149131 A1 | 6/2009 | Young et al. |
| 2009/0150175 A1 | 6/2009 | Young et al. |

(56) References Cited

U.S. PATENT DOCUMENTS

| | | |
|---|---|---|
| 2009/0247368 A1 | 10/2009 | Chiang |
| 2009/0258758 A1 | 10/2009 | Hickman et al. |
| 2009/0275442 A1 | 11/2009 | Nissila |
| 2009/0287103 A1 | 11/2009 | Pillai |
| 2009/0292178 A1 | 11/2009 | Ellis et al. |
| 2009/0293298 A1 | 12/2009 | Martorell et al. |
| 2010/0035726 A1 | 2/2010 | Fisher et al. |
| 2010/0120585 A1 | 5/2010 | Quy |
| 2010/0167876 A1 | 7/2010 | Cheng |
| 2010/0190607 A1 | 7/2010 | Widerman et al. |
| 2010/0216603 A1 | 8/2010 | Somers |
| 2010/0217099 A1 | 8/2010 | LeBoeuf et al. |
| 2010/0222178 A1 | 9/2010 | Shea |
| 2010/0222181 A1 | 9/2010 | Shea |
| 2010/0234699 A1 | 9/2010 | Lanfermann et al. |
| 2011/0015039 A1 | 1/2011 | Shea |
| 2011/0015041 A1 | 1/2011 | Shea |
| 2011/0035184 A1 | 2/2011 | Aaron et al. |
| 2011/0059825 A1 | 3/2011 | Mcgown |
| 2011/0098112 A1 | 4/2011 | LeBoeuf et al. |
| 2011/0098583 A1 | 4/2011 | Pandia et al. |
| 2011/0106627 A1 | 5/2011 | LeBoeuf et al. |
| 2011/0137191 A1 | 6/2011 | Kinnunen |
| 2011/0165996 A1 | 7/2011 | Paulus et al. |
| 2011/0165998 A1 | 7/2011 | Lau et al. |
| 2011/0179068 A1 | 7/2011 | O'Brien |
| 2011/0195780 A1 * | 8/2011 | Lu ................................. 463/31 |
| 2011/0195819 A1 | 8/2011 | Shaw et al. |
| 2011/0230142 A1 | 9/2011 | Young et al. |
| 2011/0246908 A1 | 10/2011 | Akram et al. |
| 2011/0263385 A1 | 10/2011 | Shea et al. |
| 2011/0275042 A1 | 11/2011 | Warman et al. |
| 2011/0288381 A1 | 11/2011 | Bartholomew et al. |
| 2011/0319228 A1 | 12/2011 | Shea |
| 2012/0010478 A1 | 1/2012 | Kinnunen et al. |
| 2012/0058859 A1 | 3/2012 | Elsom-Cook et al. |
| 2012/0077580 A1 | 3/2012 | Mahajan et al. |
| 2012/0108395 A1 | 5/2012 | Shea |
| 2012/0129138 A1 | 5/2012 | Redmann |
| 2012/0142429 A1 | 6/2012 | Muller |
| 2012/0184871 A1 | 7/2012 | Jang et al. |
| 2012/0190502 A1 | 7/2012 | Paulus et al. |
| 2012/0203081 A1 | 8/2012 | Leboeuf et al. |
| 2012/0226111 A1 | 9/2012 | Leboeuf et al. |
| 2012/0226112 A1 | 9/2012 | LeBoeuf et al. |
| 2013/0308192 A1 | 12/2012 | Chung et al. |
| 2013/0046477 A1 | 2/2013 | Hyde et al. |
| 2013/0089842 A1 | 4/2013 | Shea |
| 2013/0090213 A1 | 4/2013 | Amini et al. |
| 2013/0090565 A1 | 4/2013 | Quy |
| 2013/0095459 A1 | 4/2013 | Tran |
| 2013/0110265 A1 | 5/2013 | Rahko et al. |
| 2013/0130213 A1 | 5/2013 | Burbank et al. |
| 2013/0155251 A1 | 6/2013 | Moravchik |
| 2013/0178960 A1 | 7/2013 | Sheehan et al. |
| 2013/0217541 A1 | 8/2013 | Shea |
| 2013/0217542 A1 | 8/2013 | Shea |
| 2013/0217543 A1 | 8/2013 | Shea |
| 2013/0218309 A1 | 8/2013 | Napolitano |
| 2013/0225369 A1 | 8/2013 | Fisbein et al. |

OTHER PUBLICATIONS

Sabrina Tai-Chen Yeh, Steven Friedlander, David Andrew Young, "Nonverbal Audio Cues During Physical Activity", file history of related U.S. Appl. No. 14/037,278, filed Sep. 25, 2013.

Sabrina Tai-Chen Yeh, Takashi Hironaka, David Andrew Young, Steven Friedlander, "Quick Login to User Profile on Exercise Machine", file history of related U.S. Appl. No. 14/037,263, filed Sep. 25, 2013.

Sabrina Tai-Chen Yeh, David Andrew Young, Steven Friedlander, "Determine Exercise Routes Based on Device Determined Information", file history of related U.S. Appl. No. 14/037,276, filed Sep. 25, 2013.

Sabrina Ta-Chen Yeh, Steven Friedlander, David Andrew Young, "Synchronized Exercise Buddy Headphones", file history of related U.S. Appl. No. 14/037,267, filed Sep. 25, 2013.

Sabrina Tai-Chen Yeh, David Andrew Young, Takashi Hironaka, Steven Friedlander, "Presenting Audio Based on Biometrics Parameters", file history of related U.S. Appl. No. 14/037,271, filed Sep. 25, 2013.

Sabrina Tai-Chen Yeh, Steven Friedlander, David Andrew Young, "Presenting Audio Video on Biometrics Parameters", file history of related U.S. Appl. No. 14/037,252, filed Sep. 25, 2013.

Sabrina Tai-Chen Yeh, Jenny Therese Fredriksson, "Combining Data Sources to Provide Accurate Effort Monitoring", file history of related U.S. Appl. No. 14/037,224, filed Sep. 25, 2013.

Sabrina Tai-Chen Yeh, Jenny Therese Fredriksson, "Intelligent Device Mode Shifting Based on Activity", file history of related U.S. Appl. No. 14/037,228, filed Sep. 25, 2013.

Jason Michael Warner, "Devices and Methods for Health Tracking and Providing Information for Improving Health", file history of related U.S. Appl. No. 14/160,871, filed Jan. 22, 2014.

\* cited by examiner

Challenge Execution Logic - Client Side

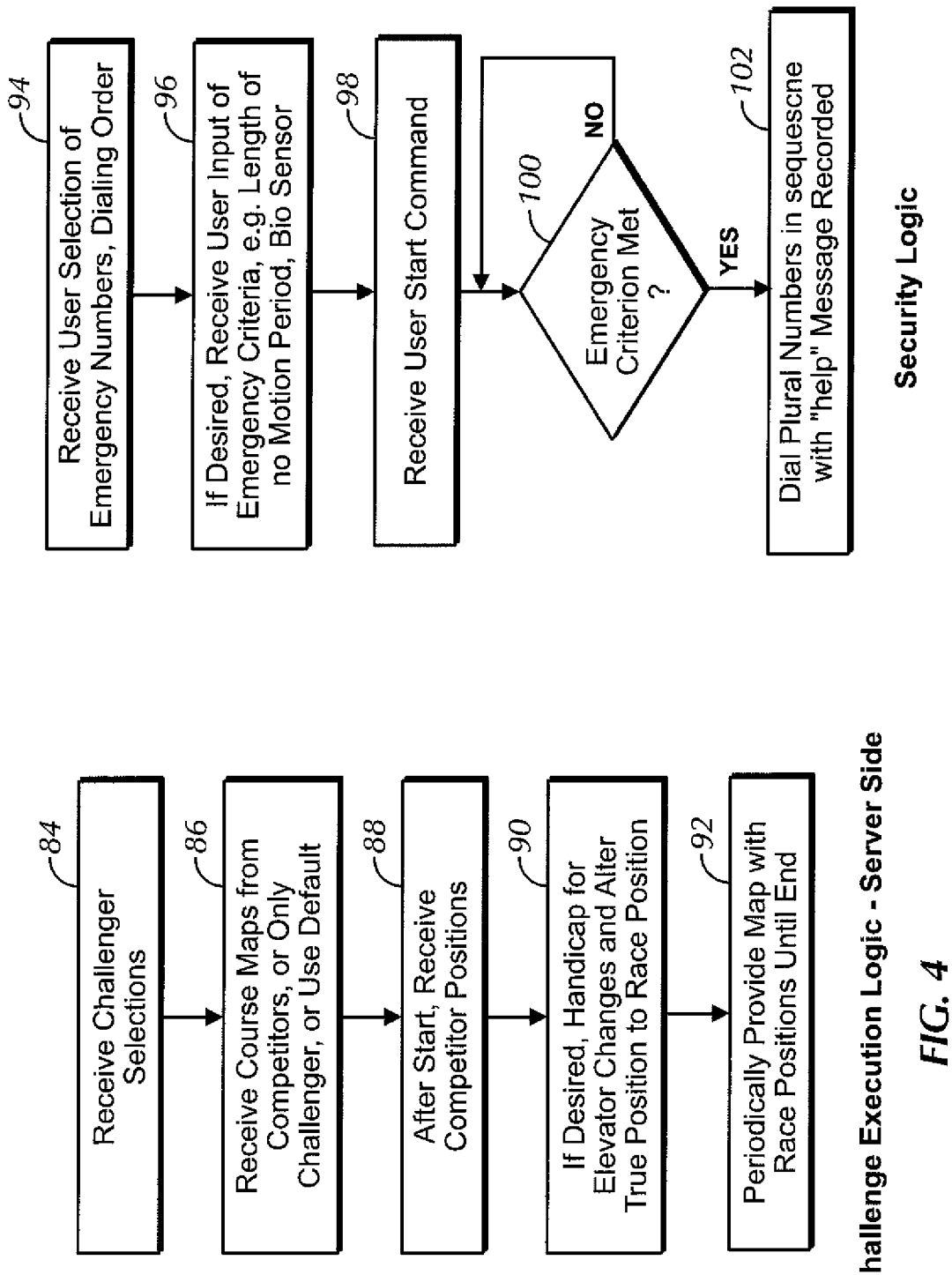

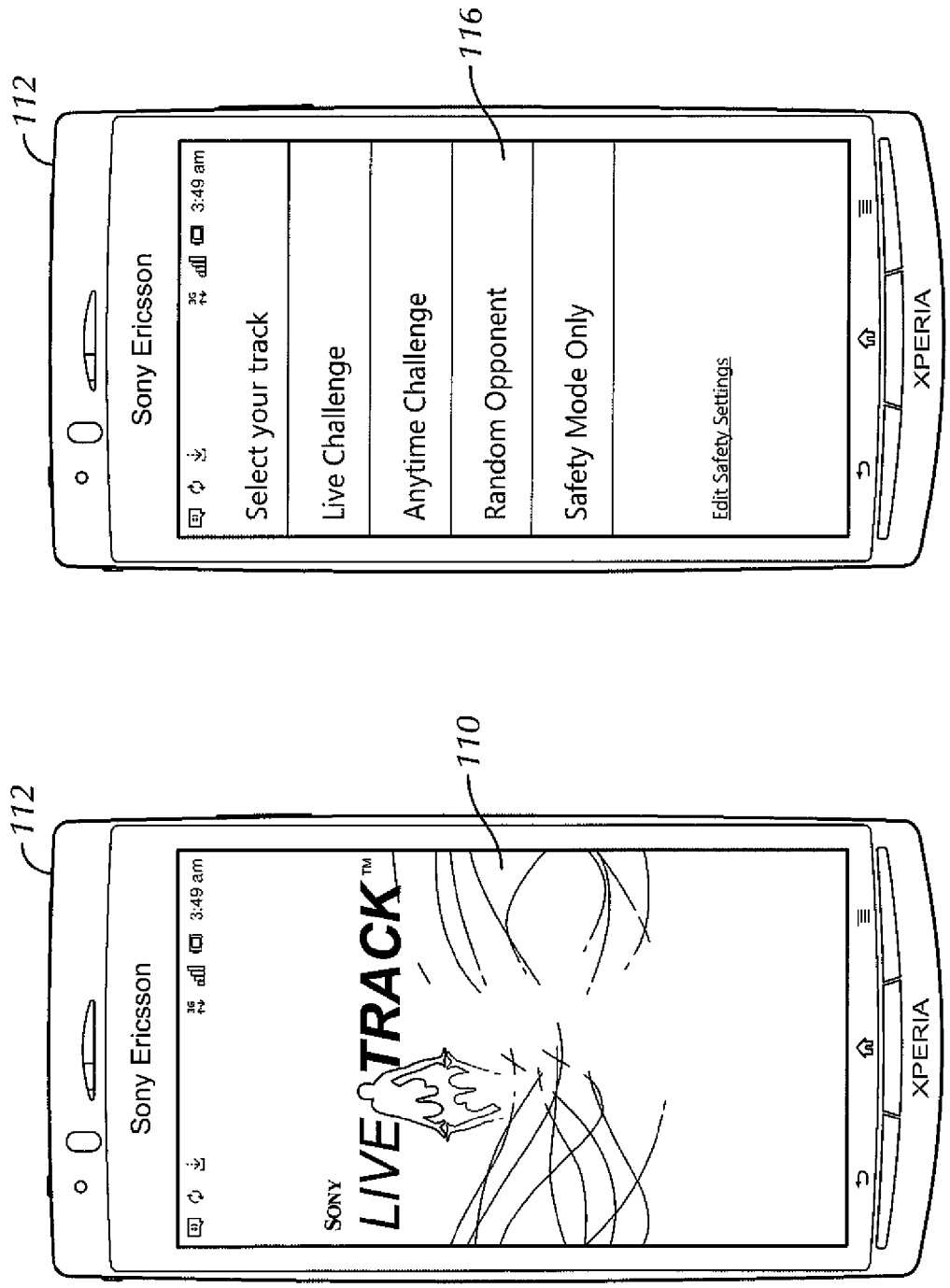

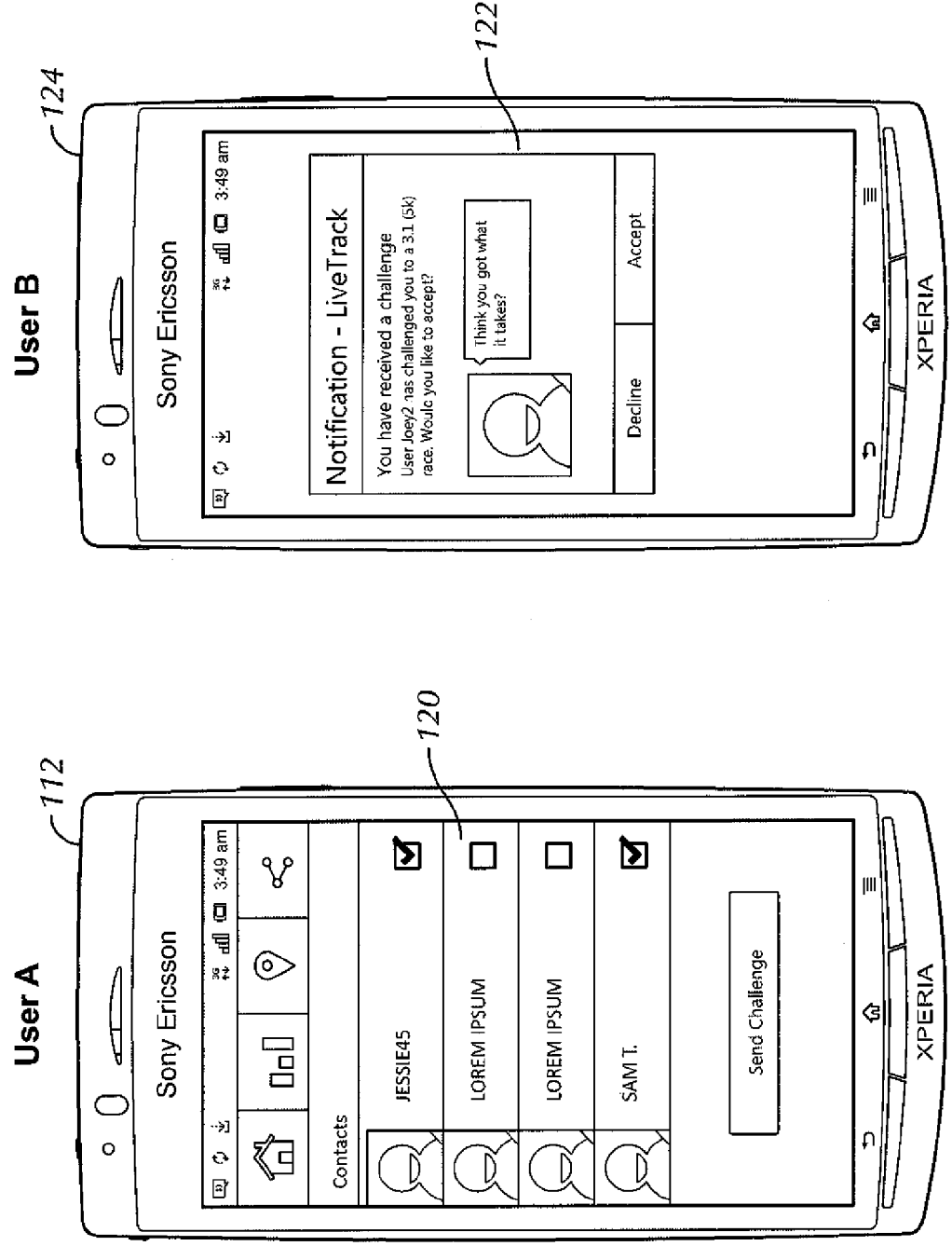

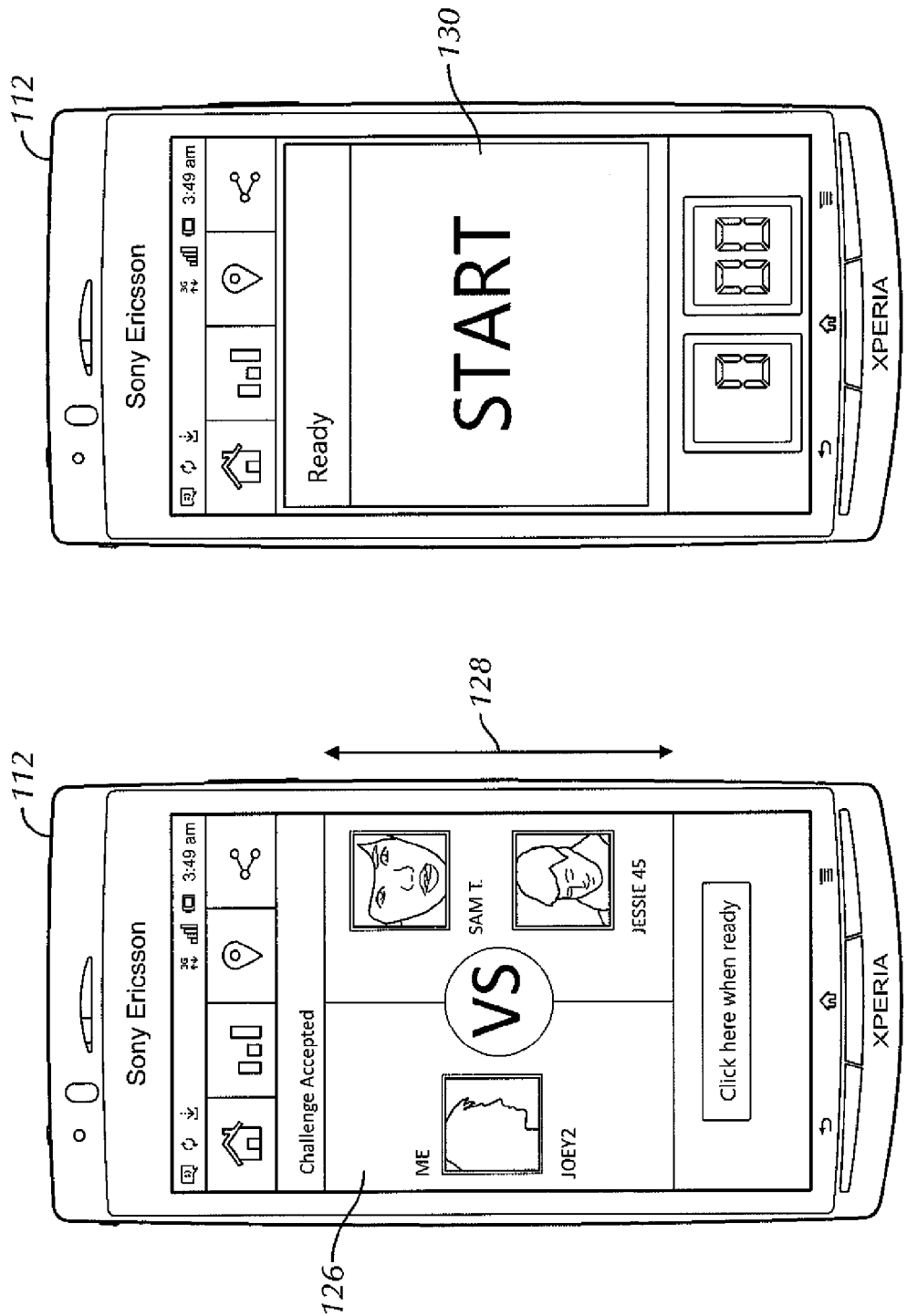

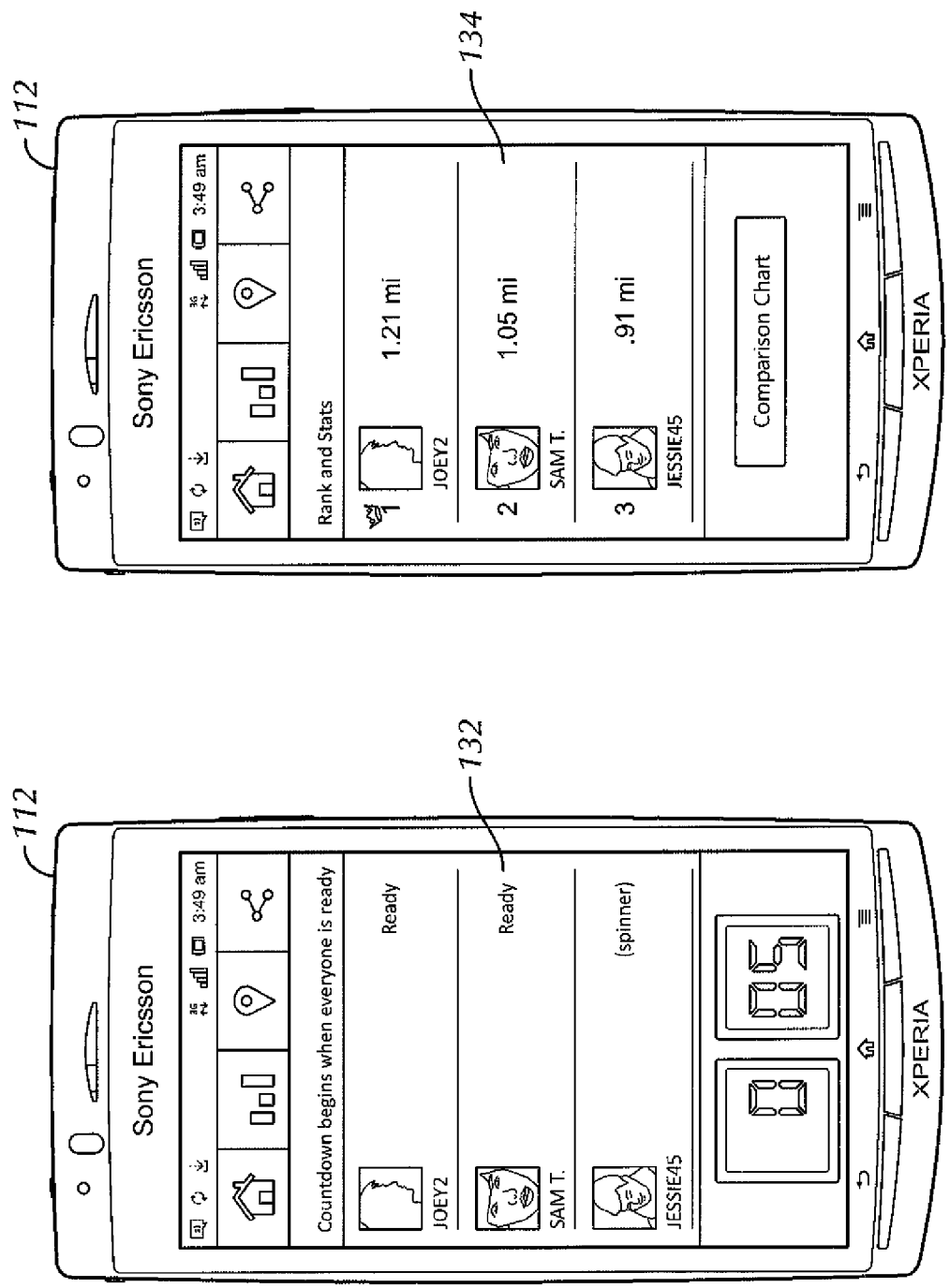

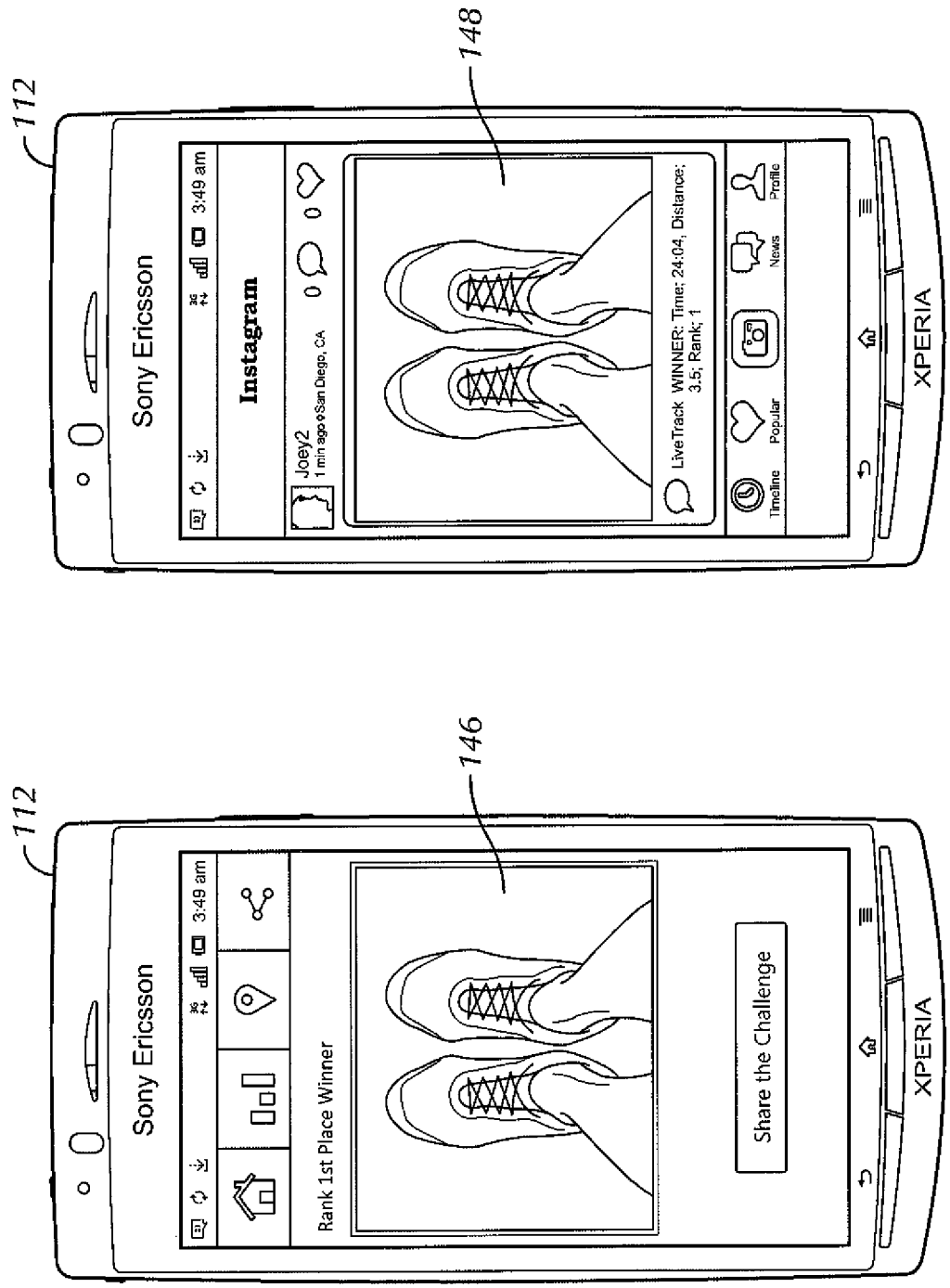

USER DEVICE POSITION INDICATION FOR SECURITY AND DISTRIBUTED RACE CHALLENGES

FIELD OF THE INVENTION

The present application is directed to leveraging position sensing in portable user computing devices for security purposes during exercise and to permit people who are distant from each other to nonetheless simultaneously compete in a group race.

BACKGROUND OF THE INVENTION

Health and safety consciousness is growing as society acquires more leisure time to enjoy outdoor exercises such as running, biking, swimming, rollerblading, and the like. As well, owing to miniaturization many people prefer to carry small computing devices such as smart phones, music players, small tablet computers, personal digital assistants (PDAs), and the like (collectively, "mobile devices") with them as they exercise. Many such devices may be provided with position sensors such as but not limited to global positioning satellite (GPS) receivers, which are discussed herein as but one example of a position sensor.

Attempts have been made to leverage the position sensing capability of mobile devices to track an individual's exercise. Also, attempts have been made to establish a communication method whereby acquaintances can arrange to meet in person for a particular race. As understood herein, however, owing to the pace of modern life, people who are distanced from each other may nonetheless wish to race each other in real time for enjoyment and exercise. Moreover, particularly in the case of female exercisers, safety and security during exercises spanning many miles can be a concern.

SUMMARY OF THE INVENTION

For convenience the present disclosure uses running as an example, it being understood that present principles apply equally to other exercises or events such as biking, rollerblading, and swimming. The user devices discussed herein typically are portable and may be implemented, without limitation, by smart phones, music players, small tablet computers, personal digital assistants (PDAs) and the like.

Accordingly, a mobile computing device includes a processor configured to receive position information from a position sensor and a display controlled by the processor. The device also includes a computer readable storage medium accessible to the processor and bearing instructions which when executed by the processor cause the processor to receive user input to challenge a friend's user device to an exercise and upload the challenge to a server. The instructions also cause the processor to receive a signal from the server indicating the challenge has been accepted and upload, to the server, position information from the position sensor at a predetermined start time. In addition, the instructions cause the processor to receive from the server map information presenting a position of the mobile device and a position of the friend's user device and receive updates of the map information including updates of the position of the mobile device and the position of the friend's user device periodically during the exercise.

If desired, the positions received from the server may be true positions as indicated by the position sensor inputting signals to the processor and a position sensor associated with the friend's user device. Also if desired, at least one position received from the server may be a race position that represents a true position as received from a position sensor adjusted for at least one elevation change of the user or at least one elevation change of the friend's user device between successive true positions uploaded to the server.

Thus, responsive to a determination that the user has traversed an elevation gain between reported true positions, a distance may be added to a true distance traveled as determined from true positions to render a race position, and the map information may thus indicate the race position. Even further, responsive to a determination that the user has traversed an elevation loss between reported true positions, a distance may be subtracted from a true distance traveled as determined from true positions to render a race position, and the map information may thus indicate the race position.

Furthermore, various user interfaces (UIs) may be presented on the display under control of the processor. For example, the processor may cause a UI to be presented on the display presenting the map information. The processor may also cause a UI to be presented on the display presenting challenge mode selector elements on a UI that include, e.g., a live challenge selector element and an anytime challenge selector element.

Also in some embodiments, the computer readable storage medium may bear instructions that, when executed by the processor, cause the processor to transmit an emergency alert to a predetermined destination based on at least one emergency criteria being met as determined by the processor.

In another aspect, a server includes a processor and a computer readable storage medium accessible to the processor and bearing instructions which, when executed by the processor, cause the processor to receive a request for an exercise competition from a first consumer electronics (CE) device and send the request to a second CE device for acceptance of the request by the second CE device.

In yet another aspect, a method includes receiving user input to a consumer electronics device (CE) to challenge a contact of the user of the CE device to an exercise and uploading the challenge to a server. The method also includes receiving a signal from the server indicating the challenge is accepted and uploading to the server position information from the position sensor at a predetermined start time. The method then includes receiving, from the server, map information presenting a position of the mobile device and a position of the contact's user device and receiving updates periodically during the exercise of the map information including updates of the position of the mobile device and the position of the contact's user device.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a flow chart of example server logic for executing a race challenge;

FIG. 5 is a flow chart of example security logic;

FIGS. 6-20 are exemplary UIs presentable on a mobile device display under control of a mobile device processor executing a challenge application in accordance with present principles;

DETAILED DESCRIPTION OF THE PREFERRED EMBODIMENT

Figure 1:
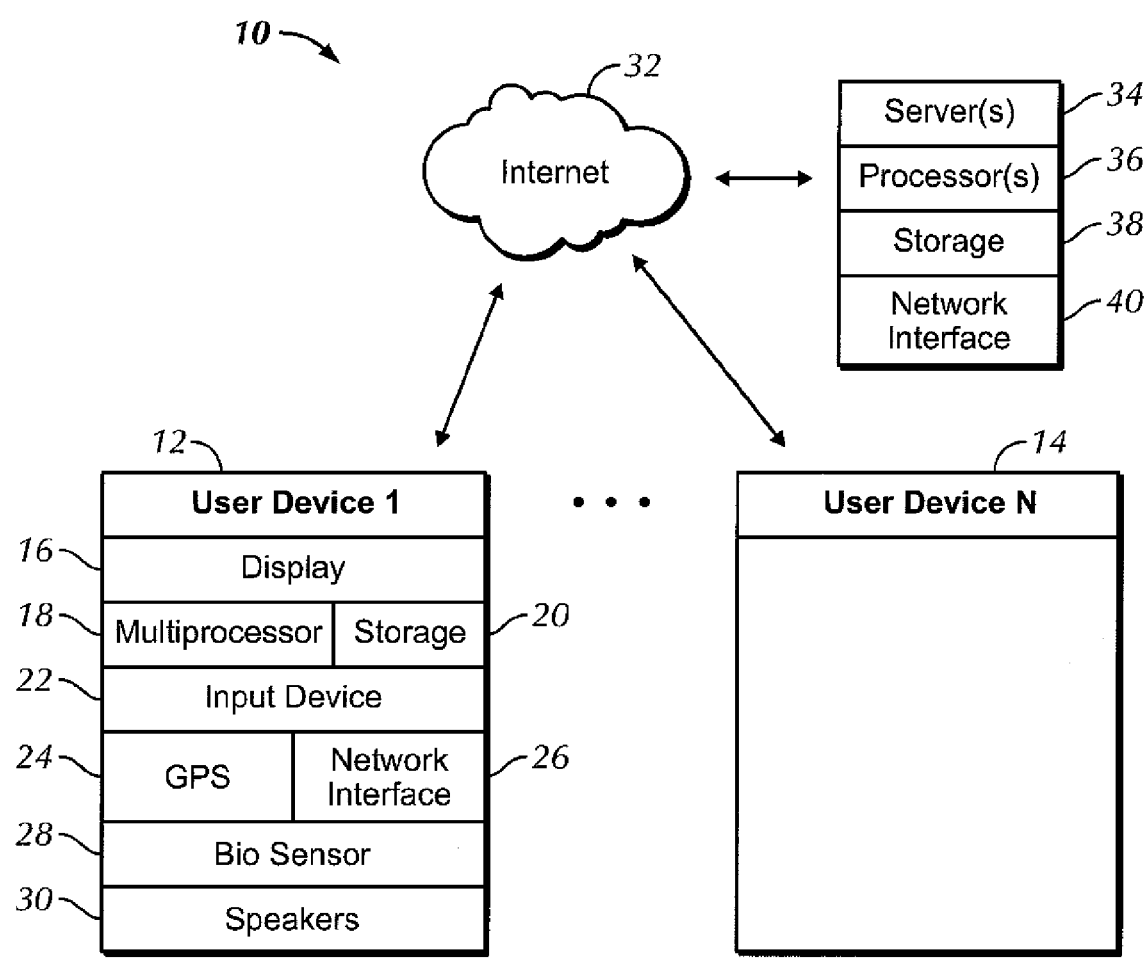
FIG. 1 is a block diagram of an example system, showing a single server and showing a first mobile device with a biometric sensor such as, but not limited to, a heart rate sensor attached, it being understood that the biometric sensor may be physically separate from the mobile device and may communicate therewith through a wire or wirelessly.

Beginning in reference to FIG. 1, an exemplary system 10 is shown. The system 10 includes a first user device 12, at least a second user device 14, and up to N user devices. The user devices 12 and 14 may be, e.g., smart phones, music players, tablet computers, personal digital assistants (PDAs), laptop computers, other small display devices such as portable Internet-enabled TVs, GPS devices, etc. The user device 12 includes at least one display 16 and at least one processor 18. The device 12 also includes at least one tangible computer readable storage medium 20 such as disk-based or solid state storage.

Furthermore, the device 12 includes at least one input device 22 such as, e.g., a touch-sensitive display, a track pad, a key pad, an audio receiver for receiving audible commands which may then be processed and executed by the processor 18, etc. Even further, the device 12 includes a global positioning satellite (GPS) receiver 24 configured to receive geographic position information from at least one satellite and provide the information to the processor 18, though it is to be understood that another suitable position receiver other than a GPS receiver may be used in accordance with present principles. Also shown on the device 12 is a network interface 26 for communication over at least one network 32 such as the Internet, an WAN, an LAN, etc. under control of the processor 18. The network interface 26 may be, e.g., a wired or wireless modem or router, or other appropriate interface such as, e.g., a wireless telephony transceiver.

In addition to the foregoing, in some embodiments the device 12 may include a biometric sensor 28 such, as but not limited to, a heart rate sensor and/or pulse sensor. However, the biometric sensor 28 may be a sensor capable of gathering other biometric information such as calories burned and steps taken during an exercise routine (e.g., running). Additionally, the sensor 28 may be a multi-biometric sensor in that it may sense information relating to two or more of the above biometrics. Also note that in some embodiments, the biometric sensor 28 may be physically separable from the device 12 and may communicate with the device 12 through a wire or wirelessly.

Also shown on the device 12 are one or more speakers 30. The speakers 30 may output audio such as the audible alerts described herein.

Furthermore, present principles recognize that the device 14, and any other user devices used in accordance with present principles, may include some or all of the components described in reference to the device 12 to undertake present principles (e.g., to have an exercise competition with another user device using the application described below).

Still in reference to FIG. 1, a server 34 is also shown. The server 34 at least includes at least one processor 36, at least one tangible computer readable storage medium 38 such as disk-based or solid state storage, and at least one network interface 40 that, under control of the processor 36, allows for communication at least with the devices 12 and 14 over the network 32. Note that the network interface 40 may be, e.g., a wired or wireless modem or router, or other appropriate interface such as, e.g., a wireless telephony transceiver. Accordingly, in some embodiments the server 34 may be an Internet server.

Before moving on to the logic of FIG. 2, note that the processors 18 and 36 are capable of executing all or part of the logic discussed below to undertake present principles, although it is to be generally understood that the processor 18 executes the logic discussed below that is to be executed on the user's end (e.g., on the device 12), and that the processor 36 executes the logic discussed below that is to be executed on the server end (e.g., by the server 34). Moreover, note that software code implementing present logic executable by, e.g., the processors 18 and 36 may be stored on the mediums shown (the computer readable storage mediums 20 and 38) to undertake present principles, it being understood that the mediums 20 and 38 are accessible at least to the processors 18 and 36, respectively. For completeness, also note that, e.g., the processor 18 communicates with the biometric sensor 30 to send and receive signals and/or information therewith, and that the display 16 and speakers 30 present information in accordance with present principles under control of the processor 18.

Figure 2:
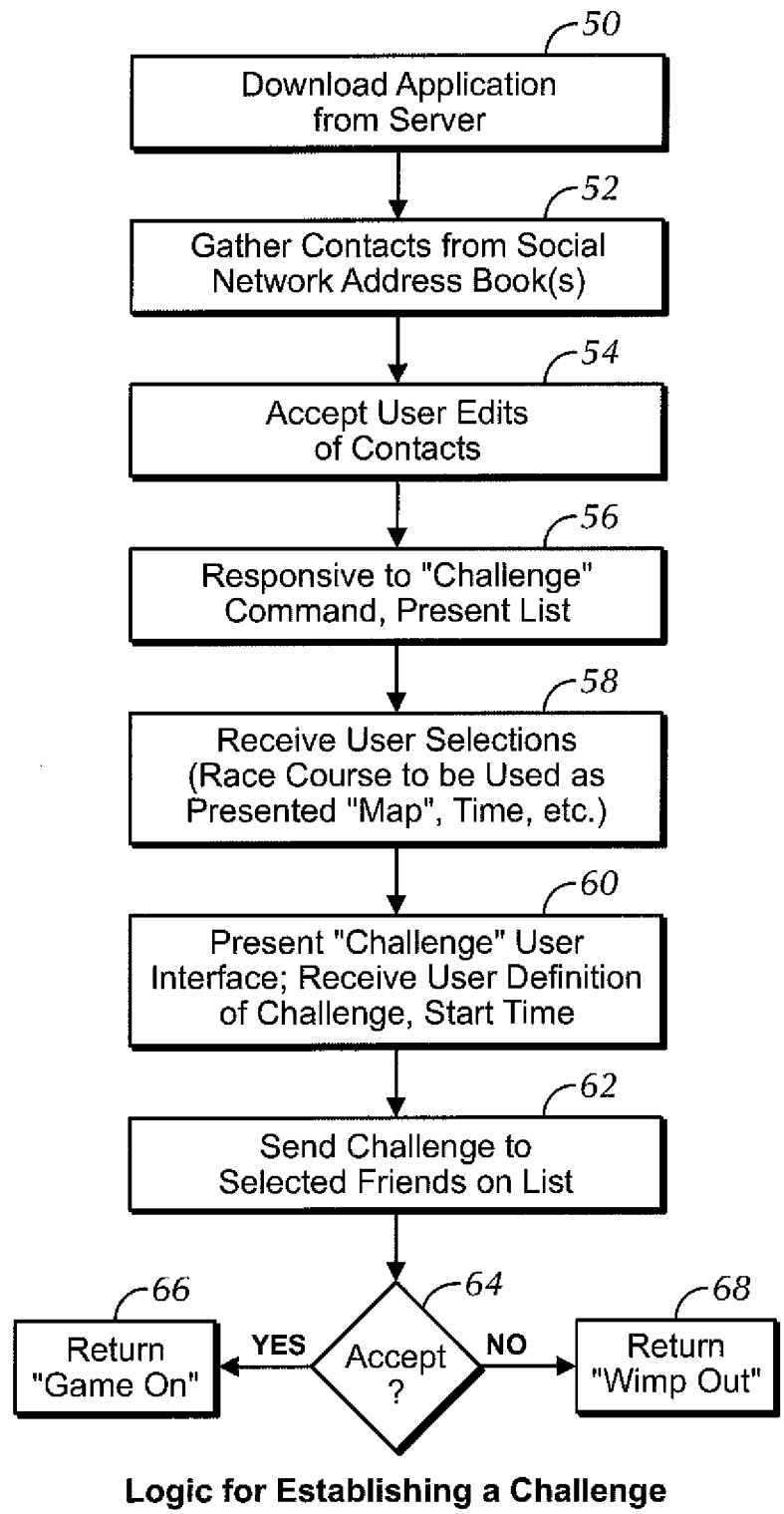
FIG. 2 is a flow chart of example logic for establishing a challenge, it being understood that present principles may be implemented by state logic as well as deterministic logic flows.

Now in reference to FIG. 2, a flow chart of example logic for establishing a challenge is shown, it being understood that present principles may be implemented by state logic as well as deterministic logic flows. Beginning at block 50, the logic downloads an application from a server to at least in part undertake present principles such that the application may be manipulated by a user of a mobile device to engage in an exercise challenge and/or competition with at least one friend/contact. However, it is to be understood that in some implementations, the application may come pre-loaded on the mobile device at the time of purchase and/or acquisition from, e.g., a mobile device vendor or manufacturer.

Regardless, the logic moves from block 50 to block 52, where the logic gathers contacts from, e.g., a contact list associated with the mobile device, a social network address book accessible on the mobile device, etc. for presentation to the user of the mobile device using, e.g., the application downloaded at block 50. The logic then proceeds to block 54 where the logic accepts a user's edit of the contacts using, e.g., the application. For instance, there may be tens or hundreds of contacts gathered at block 52, so a user may delete many of those contacts on the list presented by the application at block 54 if the user does not wish to ever engage in an exercise challenge with them.

However, note that in addition to or in lieu of the foregoing, a user may manually enter contacts to a list presented by the application such that, e.g., the user may select an "add" selector presented with the list, which then causes the device processor to access, e.g., the contact list or social network address book described above to present contacts therefrom so that the user may select at least one contact to add.

Regardless, from block 54 the logic proceeds to block 56 where the logic, responsive to a "challenge" command from a user of the mobile device, presents the list of contacts. Then at block 58 the logic receives a user's selection(s) of contacts to which to send a challenge request. In addition, at block 58 the logic may also receive selection of a race course or route the user wishes to use as the position map that will be presented on the display of the mobile device, as further described below. Note that the contact to which the challenge is sent (using a second mobile device) may be presented with similar options (e.g. race course) using a similar mobile device with under control of the same application downloaded to the second and/or similar device, though it is to be understood that the contact may select a different race course and/or route presentation than did the user of the first device at block 58. Whether different maps are used or not, it is to nonetheless be understood that true positions and/or race positions as described below are reflected on the same map if selected, or on the differing maps that still present the position information in a way allowing both participants to understand the relative positions of the devices with respect to each other during the challenge.

Still in reference to FIG. 2, the logic moves from block 58 to block 60 where the logic presents a challenge user interface (UI) on the display of the mobile device and receives various user-input parameters and/or definitions for the challenge, such as, e.g., distance to run to establish the finish/end of the challenge, start time, finish time, maximum time to complete the challenge, speed (e.g., a minimum or maximum speed which the user and/or contact is to run or otherwise exercise), a maximum change in elevation that will result in a race position adjustment on the position map as set forth herein (e.g., such that a change in elevation during the challenge greater than the maximum specified by the user at block 60 will not result in an adjustment to the race position on the position map), etc. From block 60 the logic proceeds to block 62 where the challenge formulated according to the selected parameters and/or definitions selected at block 60 is sent to at least one contact from the list.

Thereafter, the logic moves to decision diamond 64 where the logic determines whether the challenge has been accepted (e.g., the logic may receive an acceptance and/or confirmation notification from the device to which the request was sent). If the challenge has been accepted, the logic moves to block 66 where the logic returns and/or presents an audible and/or visual message to the user of the mobile device indicating that the challenge has been accepted. For example, the logic may present the phrase "Game On!" on the display of the mobile device.

However, if the challenge is not accepted (e.g., denied and/or not accepted within a predetermined period of time), the logic moves from diamond 64 to block 68, where the logic returns and/or presents an audible and/or visual message to the user of the mobile device indicating that the challenge has not been accepted. For example, the logic may present the phrase "Wimp Out!" which indicates that the contact to which the challenge was sent denied the challenge.

In addition to the foregoing, note that the contact's acceptance can be conditional in some embodiments. For example, the contact may accept the challenge on the condition that the challenge be to run for four miles rather than five, that the start time be different than the one selected by the user of the first device, etc., which may then be conveyed to the user of the mobile device using the application. Again note that both devices may be operating the same or substantially similar applications to negotiate the challenge parameters (e.g., the same application downloaded from the Apple App Store). It is to be further understood that any such negotiation of the challenge parameters and/or conditions may go back and forth until an agreement is reached (e.g., after receiving the request that the distance be four miles rather than five, the user may manipulate the application on his or her mobile device to send a response indicating that they split the difference and exercise for four and a half miles).

Figure 3:
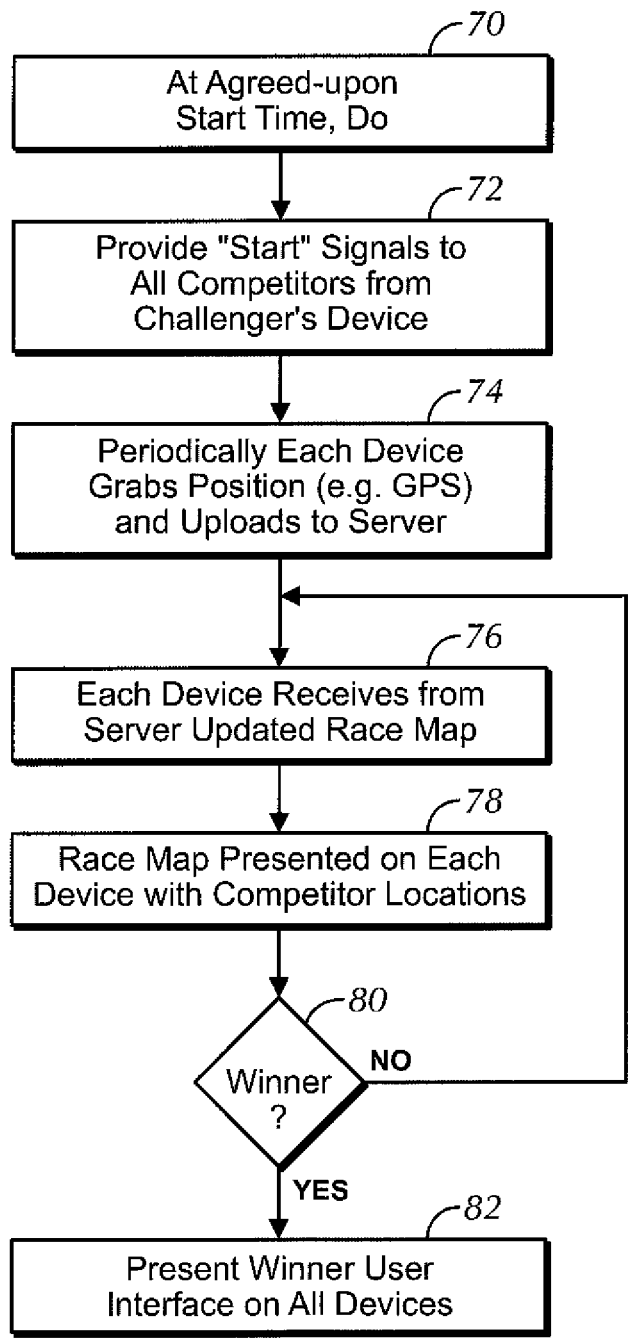
FIG. 3 is a flow chart of example mobile device logic for executing a race challenge.

Continuing the detailed description with reference to FIG. 3, a flow chart of example mobile device logic for executing a challenge is shown. Beginning at block 70, at the agreed-upon start time for the challenge, the logic returns "Do" (e.g., the logic begins). Then at block 72 the logic provides start signals to all competitors/participants from the user's mobile device. Note that as used below, the term "challenger" is understood to refer to the user of the mobile device that initiated/requested the challenge.

Moving from block 72 to block 74, during the challenge the logic may constantly or periodically determine position information (e.g., GPS coordinates using a GPS receiver on the mobile device) and upload the position information to a server in accordance with present principles. Note that each device associated with a person participating in the challenge may similarly execute the logic of FIG. 3, and thus each of the participants may upload position information to the server during the challenge. Furthermore, note that in addition to or in lieu of the respective mobile devices of the participants gathering position information and uploading it to the server, the server may constantly or periodically poll each device for position information and/or request that position information be transmitted.

Regardless, after block 74 the logic moves to block 76 where the logic receives an updated position map from the server that includes the location of each participant, which is then presented to the participant, e.g., using a display on the mobile device at block 78. Thereafter, at decision diamond 80 the logic determines whether there is a winner of the challenge (e.g., if one of the participants has exercised for the requisite distance, which may be adjusted based on elevation changes as set forth below). If the logic determines that there is no winner at the time of the determination, the logic returns to block 76 and proceeds from there as described above. However, if the logic determines that there is a winner at the time of the determination at diamond 80, the logic instead moves from diamond 80 to block 82 where the logic presents a winner UI on the mobile device notifying the participant associated with the device that there is a winner of the challenge. Thus, in exemplary embodiments the winner UI may be presented on the mobile device of each participant once the logic determines that there is a winner of the challenge.

Furthermore, the determination of a winner of the challenge may in some embodiments be determined by one mobile device and then transmitted to the mobile devices of the other participant(s), and/or may be determined by the server and transmitted to all mobile devices of the participants, and/or may be at least substantially simultaneously determined by each mobile device of a participant executing the logic of FIG. 3.

Now in reference to FIG. 4, a flow chart of example server logic for executing a race challenge is shown. Beginning at block 84, the logic receives challenger selections and challenge parameters (e.g., information pertaining to the participants, the distance to be exercised, the start time, etc.). Then at block 86 the logic receives course and/or route maps from one or more participants, and/or only one participant, and/or the server may use a default or preset map. Regardless, from block 86 the logic proceeds to block 88 where, after the challenge begins, the logic constantly or periodically receives the positions and/or position information of the participants. Then at block 90 the logic may handicap for changes in elevation of one or more of the participants while the challenge occurs and alter their true position as reflected on the map(s) to reflect an adjusted race position in accordance with the elevation change principles set forth below. Concluding FIG. 4 at block 92, the logic at least periodically provides map updates reflecting the race positions of the participants until the end of the challenge, though if desired the logic may do so constantly.

It is to be understood that, in handicapping for elevation changes at block 90, the server may use a heuristically-determined handicap factor to alter the participants' true positions to race positions as indicated above, with the race positions being presented on the maps downloaded to the participants. For example, if participant A uploads successive positions that, when compared with a topographical map stored in a database of the server, indicate the participant ran the intervening distance at a zero grade (flat), no change to true position may be made. In contrast, if participant B uploads successive positions that, when compared with the topographical map, indicate that the participant B ran the intervening distance at a 1% uphill grade, 5% of the intervening distance may be added to the actual distance so that the race position would equal true position plus 5% further along the course. Yet again, if participant C uploads successive positions that, when compared with the topographical map, indicate that the participant B ran the intervening distance at a 1% downhill grade, 5% of the intervening distance may be subtracted from the actual distance so that the race position would equal true position but 5% less along the course. The above adjustments can be maintained throughout the race, modified as appropriate by succeeding adjustments. The race positions are returned on the map(s) downloaded to the participants instead of the true positions, and when a participant's race position indicates that the participant is the first to attain the finish position, the server indicates that the race has been won by that participant.

However, note that while adjusted (race) positions are returned on the map and used to determine that the race is finished, true positions are used to determine elevation changes for handicap purposes. As an example, suppose a previous map update iteration resulted in a participant being credited with 5% more distance than the participant actually ran. The next iteration would use the distance between the last true position and the current true position to determine the handicap adjustment, if any, and apply it to the new race position, which would be determined by adding to the prior race position the distance between the prior true position and the current true position, plus or minus the handicap adjustment for elevation gain or loss. The server thus maintains parallel positions for each participant, i.e., a set of successively reported true positions for determining elevation change adjustments and a corresponding set of race positions that are the true positions adjusted for elevation changes, with the race positions being used to determine when and if a participant has completed the challenge distance.

The above description is an example of how elevation changes may be handicapped. Other methods may be used. For example, true positions may be used and plotted on the map that is returned to the participants' devices throughout the race. When a participant is within a predetermined distance from the finish, the above-described handicapping for elevation changes along the route may be applied and if a participant's race position is determined to have pushed that participant across the line, the participant is declared the winner. Or, true positions may be used throughout and when the first participant's true position indicates she has crossed the finish line first, handicaps for elevation may be applied post-race to alter the order of finish, if appropriate, prior to declaring which participant won the race. Or in other implementations, change in elevation may not be accounted for at all. Note that whether or note the server is to handicap for elevation changes may be determined based on user input (e.g., when receiving user selections at block 58 of FIG. 2).

Turning to FIG. 5, a flow chart of example security logic in accordance with present principles is shown. Present principles recognize that safety and security during exercises and/or challenges may be a concern for many reasons. For instance, should a health emergency occur (e.g., an asthma attack or heart attack) or should an assault occur, the present application recognizes that the mobile devices and/or applications described herein may be utilized to, e.g., notify someone of the peril experienced by the user of the mobile device.

Accordingly, the logic of FIG. 5 beings at block 94, where the logic receives user selection of emergency telephone numbers, contact information, and/or contact selections (e.g., using the application described herein to access a list of contacts). These telephone numbers may include not just friends and contacts of the user, but also, e.g., an emergency hotline such as 911, the local fire department, or the local police department. At block 94 the logic may also receive a dialing order for the numbers such that they may be contacted in a sequence specified by the user, e.g., until one of the contacts accepts the telephone call or otherwise responds. Then at block 96, if desired, the logic may also receive user input of emergency criteria, such as, but not limited to, a length of time where no motion (e.g., change in position) is detected during a challenge and/or a certain parameter based on information from the biometric sensor (e.g., a dramatic drop in the user's pulse below a threshold) to thereby trigger an emergency alert.

Then at block 98 the logic receives a start command from the user that, e.g., indicates the user is beginning a challenge or is otherwise beginning an exercise routine that the user wishes to have monitored by the application. After block 98, the logic continues to decision diamond 100 where the logic determines whether one or more emergency criteria have been met. If the criteria have not been met, the logic loops back to after block 98 to make one or more subsequent determinations at diamond 100. If, however, the logic determines that at least one emergency criterion has been met, the logic proceeds to block 102 where the logic of the mobile device dials at least one telephone number in the sequence received at block 94 or otherwise initiates contacting of a person on the list, and may convey a "help" message when the person is reached. In some embodiments, the help message may be prerecorded, and/or may include particular information of the location of the user. For instance, the logic may use computerized voice rendering technology to provide a computerized audible message that the user is in trouble and also provide the location of the user by indicating, e.g., the road the user is on or from which the last known position signal was received. Other information may be provided as well, such as the time of day, current weather conditions, and/or current traffic conditions.

Reference is now made to the exemplary UIs of FIGS. 6-20. It is to be understood that the UIs described below (as well as, e.g., the portal also described below) may be presented on a mobile device under control of a mobile device processor in accordance with present principles. Furthermore, in exemplary embodiments the UIs described below may be presented as part of an application downloaded to the mobile device for to engage in an exercise/athletic challenge and/or provide added security during an exercise as set forth above.

Accordingly, reference is made to FIG. 6, which shows an introductory UI 110 being presented on a mobile device 112 such as, e.g., a smartphone and/or the device 12 described above. This introductory UI 110 may be presented, e.g., after selection of an icon associated with an exercise challenge application from a home screen of the device 112 that was downloaded to the device 112 over the Internet, and may remain on the display and while the application and/or its features are loading. FIG. 7 shows a mode selection UI 116 presented on the device 112. As may be appreciated from the UI 116, several selectors for different modes may be presented to a user of the device at one time, such as, e.g., a live challenge selector (e.g., simultaneous exercise of two participants), an anytime challenge selector (e.g., a challenge defined by certain parameters that may be completed by participants at different times), a random opponent selector (e.g., such that, when selected, a processor of the device 112 selects a random person from a contact list accessible to the device and/or a specified preset contact list of challenge contacts, and sends a challenge request to them), and a safety mode only selector. The safety mode only selector may be selected, e.g., when a user of the device 112 wishes to exercise without participating in a challenge or competition with anyone yet still have their exercise monitored in case of, e.g., heart attack as set forth above. However, it is to be further understood that a safety mode may be used while the user is participating in a challenge.

Figure 8:
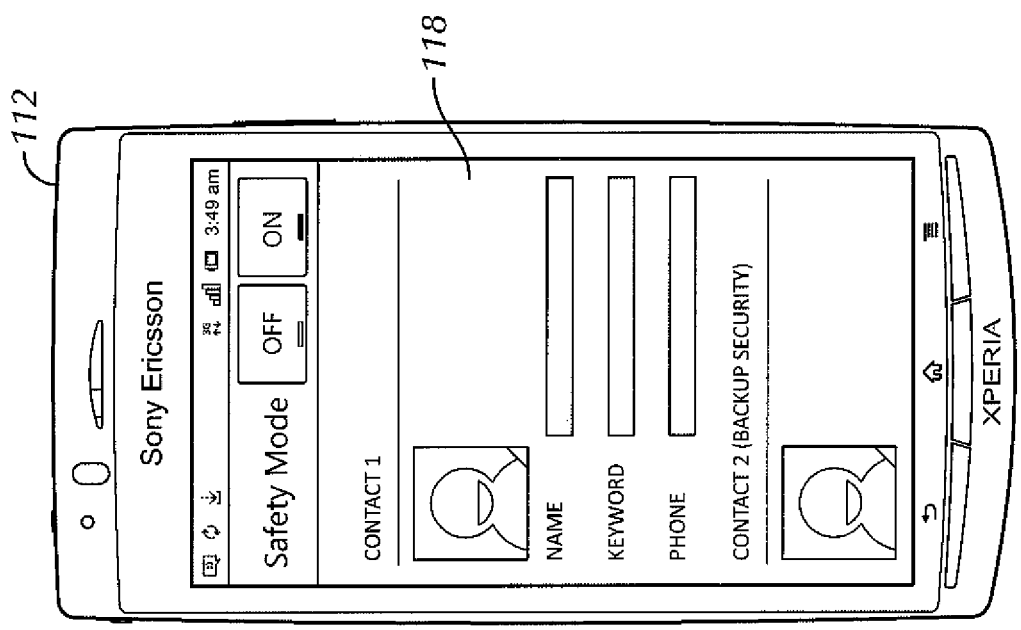

Moving on to FIG. 8, a UI 118 is presented on the device 112 responsive to, e.g., selection of the live challenge selector from UI 116. As may be appreciated from UI 118 of FIG. 8, a contact may be manually input to the UI 118 such that a user may input, e.g., the user's name and telephone number, as well as contact information for a backup contact. As may also be appreciated from the UI 118, the user is given the option to turn the safety mode on or off during the challenge via the "yes" and "no" selectors shown. Thus, in one embodiment the backup contact need not necessarily be a person participating in the challenge but merely a person that is contacted in case of an emergency.

However, it is to be understood that in other embodiments, a UI similar to the UI 118 may be presented when the application is in safety mode only rather than a challenge mode. Also note that in exemplary embodiments, the contacts shown on the UI 118 may be immediately contacted simply by, e.g., a press and hold action over the position of the contact's name on the touch screen, or a press and hold action anywhere on the screen. Even further, should the user of the device 112 be in peril (e.g., if the device 112 is in safety mode only and the person is exercising without participating in a challenge), a UI such as the UI 118 shown may be configured such that, by pressing and holding anywhere on the screen, the application and/or device 112 not only calls all the contacts on the list, but continues to sequentially call them until at least one is reached or otherwise responds (e.g., for help).

Regardless, it is to be understood that in lieu of, or in addition to, the UI 118 being presented on the device 112 responsive to selection of a challenge mode selector, a UI 120 as shown in FIG. 9 may be presented responsive to selection of, e.g., a live challenge mode selector from the UI 116. As may be appreciated from FIG. 9, a list of contacts is presented on the UI 120 that may have been gathered by the application and edited by a user as set forth above, or may be, e.g., a contact list pulled directly from an address book associated with the device 112. Either way, it is to be appreciated that one or more contacts may be selected from the UI 120 (e.g., one or more contacts may be highlighted to indicate the contact has been selected), and then the "send challenge" selector may be selected to cause the device 112 to send the challenge to one or more mobile devices associated with the selected contacts.

Before describing FIG. 10, also note that plural additional selectors are shown at the top of the UI 120 such as, e.g., a home selector that, when selected, may cause a home screen of the application and/or a home screen of the device 112 to be presented. Still other selectors may be presented, such as a GPS selector which, when selected, causes a UI to be presented to allow the user to turn the GPS capabilities of the device 112 on or off.

Now in reference to FIG. 10, a UI 122 is presented on a device 124 associated with a contact to which the challenge has been sent. Note that the UI 122 includes a "Notification" indicator as well as information about the challenge such as, e.g. a distance to be ran as part of the challenge and information on the person who sent the challenge. Also note that the information may include a personalized message from the challenger, such as, e.g., "Think you got what it takes?" Thus, the contact to whom the challenge was sent may accept or decline the challenge using an accept selector or a decline selector on the UI 122.

Now addressing FIG. 11, it is to be understood that reference is made back to the device 112 described above in reference to FIGS. 6-10 (e.g., the device associated with the challenger). Thus, a UI 126 is presented on the device 112. In addition to various selectors at the top of the UI 126 as described above (e.g., a home selector), the UI 126 includes an indication that the challenge has been accepted by positioning photos on the device associated with the contacts to which the challenge was sent and the abbreviation of the word "versus" to indicate that the challenger (in this case, "Joey") will be competing against two contacts that accepted the challenge (in this case, "Sam T. and "Jessie45"). As indicated by the arrows 128, the challenge may have been accepted by more participants than can be presented on the display of the device 112 at one time, and hence the UI 126 may be scrolled up or down to view the participants. Last, note that a "click here when ready" selector is included on the UI 126, which when selected may cause the challenge to begin, or for a "ready" status to be entered as described below.

Accordingly, in exemplary embodiments the "click here when ready" selector, when selected, causes the UI 130 of FIG. 12 to be presented. The UI 130 includes, e.g., a "ready" indication that indicates that the application is ready to begin processing one or more operations during the challenge (e.g., sending position information to a server). The UI 130 also includes a "start" selector that, when selected, may cause the challenge to begin for all participants and thus cause the application to function accordingly, or may instead cause the UI of FIG. 13 to be presented. Before getting to FIG. 13, note that a timer and/or stopwatch is also shown on the UI 130 which may change over time to reflect the time that has elapsed during the challenge. Also note that a server in accordance with present principles may use a timer to track the length of the challenge.

Now in reference to FIG. 13, after selection of the start selector from the UI 130, a UI 132 may be presented that includes, e.g., a list of the contacts participating in the challenge and a status indicator that indicates that they are ready to begin the challenge. Note that each of the participants may have also selected a "start" selector from a UI similar to the UI 130 to thereby cause their respective mobile devices to send out signals indicating they are also ready, which may be received by the device 112 to thereby render the status indicators shown on the UI 132. Also note that other information may be presented on the UI 132, such as an indication that the challenge will begin as soon as every participant is ready, as well as a timer.

Moving on to FIG. 14, a UI 134 is shown. The UI 134 may be presented responsive to, e.g., selection of a selector element at the top of the UI 112 (e.g., the selector second from the left) to cause the UI 134 to be presented, which shows the ranks (e.g., based on the number of past challenges a contact has won against the user of the device 112) and statistics of the challenge participants.

For example, it may show the average distance the participants have traveled during past challenges, or the distance they are expected to travel during the present challenge after accounting for elevational changes as set forth herein, e.g., if they entered the route they plan to take for the current challenge to their respective mobile devices/applications. Also note that a comparison chart selector is presented on the UI 134 that may cause a chart to be presented on the device 112 reflecting various other pieces of information related to past challenges and estimated outcomes of the present challenge.

As but another example, the UI 134 may be presented in the middle of a challenge currently being participated in, and thus may reflect information regarding how far each participant has traveled during the current challenge in addition to other information. Therefore, in one exemplary implantation, the ranks shown on the UI 134 may be the current ranks of the participants of the ongoing challenge. Accordingly, it may be appreciated from the UI 134 that Joey is currently in the lead based on the metric of having traveled the farthest distance so far during the challenge.

Figure 15:
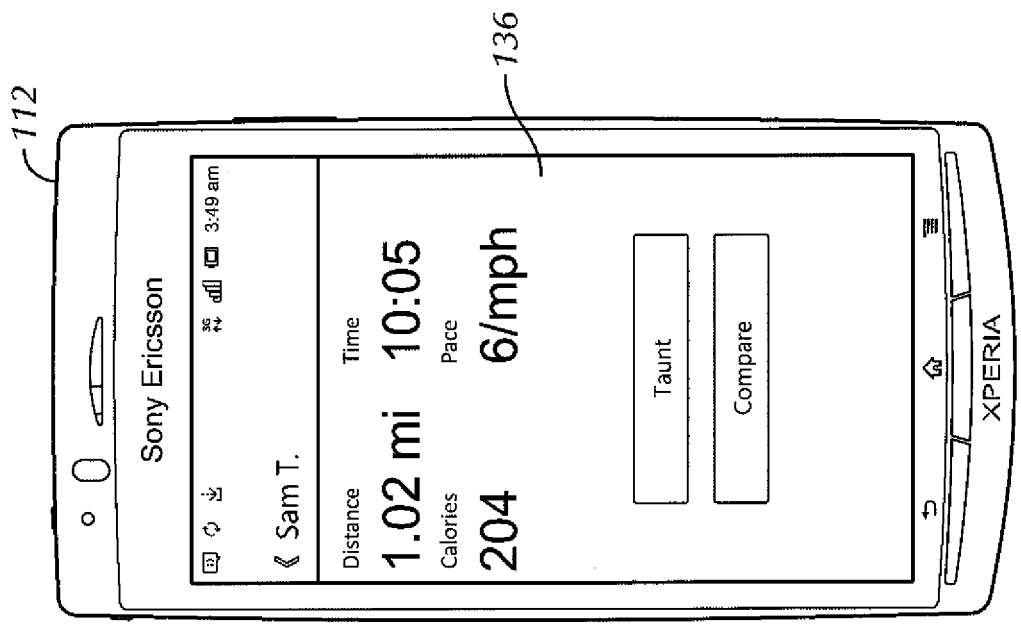

Continuing the detailed description in reference to FIG. 15, a UI 136 is shown, which may be presented responsive to selection of one of the contacts from the UI 134 described above. Thus, the exemplary UI 136 details that contact "Sam T." has traveled over one mile in over ten minutes during the current challenge. Also note that the UI 136 indicates the calories Sam T is estimated to have burned during the challenge thus far (which may have been provided by Sam T's mobile device), as well as Sam T's pace (as may have also been provided by Sam T's mobile device and/or a server in accordance with present principles).

In addition to the foregoing, also note that a "taunt" selector and a "compare" selector are shown on the UI 136 of FIG. 15. If the compare selector is selected, a chart, graph, or other presentation comparing statistics of Sam T to the user of the device 112 may be presented. E.g., a comparison may reflect the difference in calories burned by each of the two people, the distance traveled by each person, and/or the pace of each person.

Figure 16:
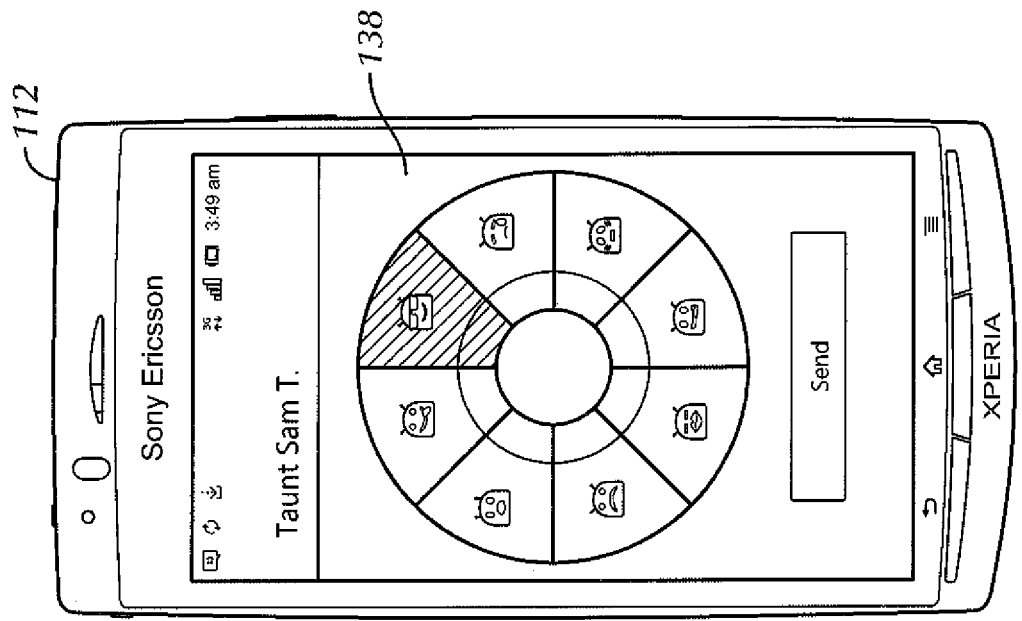

If, however, the taunt selector is selected, the UI of FIG. 16 may be presented. Accordingly, FIG. 16 shows a UI 138 that may include, e.g., plural emoticons that may be selected and then sent to Sam T using the "send" selector to thereby taunt Sam T. However, note that in addition to or in lieu of sending an emoticon, present principles recognize that, e.g., text messages and emails may also be sent using the application to taunt Sam T or otherwise communicate with Sam T (or any other participant) before, during, and after the challenge.

Figure 17:
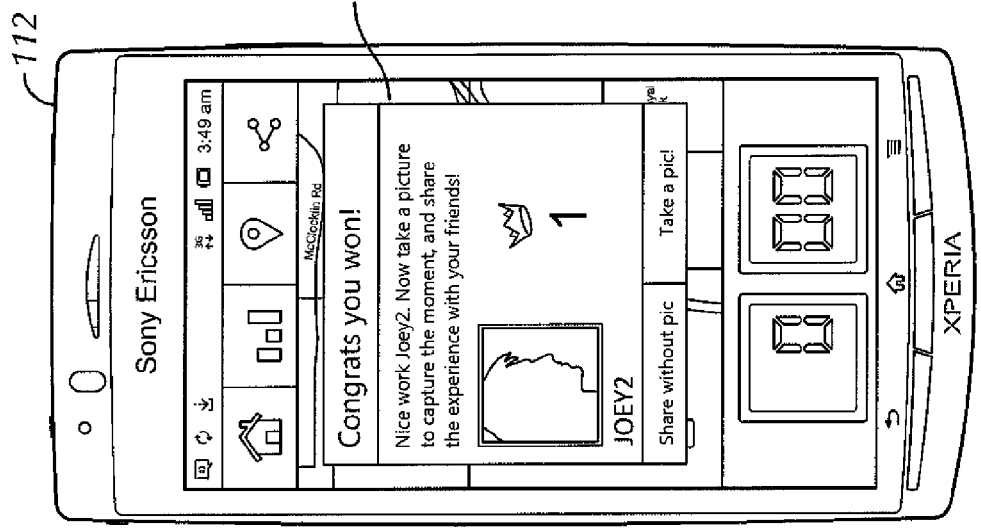

Now in reference to FIG. 17, a UI 140 is presented on the device 112 and includes a map 142. In exemplary implementations, the map 142 may be a race map that can be adjusted by, e.g., a server to account for elevational changes in the routes of the various participants as set forth herein, or may be a true position map reflecting the true position and/or distance traveled by the participants, but in either case allows the user of the device 112 to race "virtually" and/or otherwise monitor the other participants during the challenge. In some embodiments, the map may simply be a bar graph with the longest bar indicating the participant in the lead and the shortest bar indicating the participant in last. In still other embodiments, the map 142 may be, e.g., a Google map showing the general area surrounding one of the participants and a highlighted path indicating the distance and route they have traveled so far. Furthermore, note that a timer is also shown on the UI 140 indicating that, in this case, five minutes has elapsed during the challenge.

Again note that present principles recognize the desirability of being able to race virtually and socialize with participants of a challenge that otherwise would not be able to exercise together and/or compete due to, e.g., a large distance separating the participants. It may be appreciated from all the UIs described herein, but particularly the UIs shown in FIGS. 18-20, how the social benefits of the present application may be realized.

Figure 18:
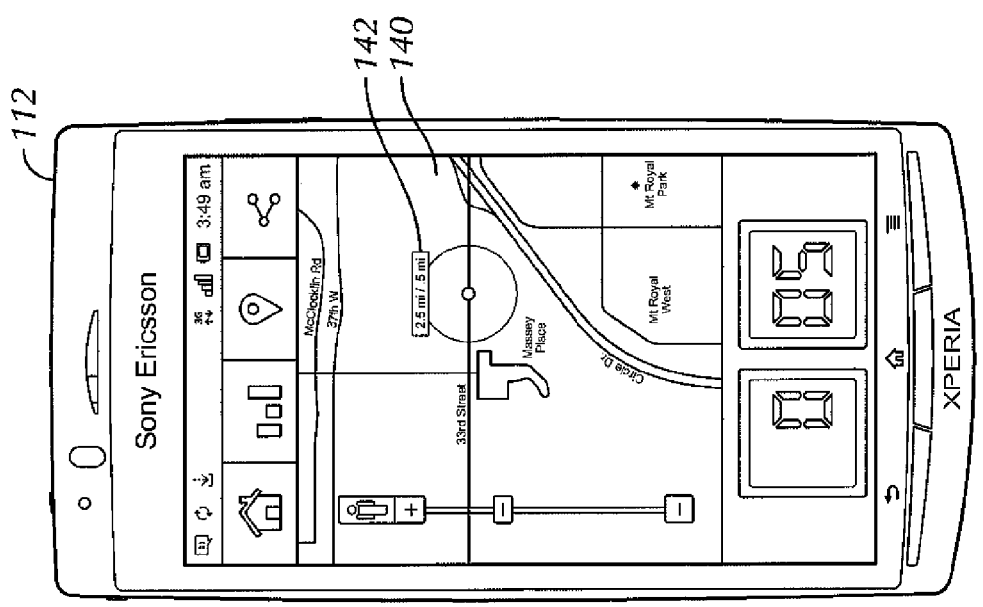

Accordingly, FIG. 18 shows a UI 144 that indicates, e.g., that the user of the device 112 (in this case, the challenger) has won the challenge. Other information and/or instructions may also be presented. For instance, the user may be instructed to take a picture and share the picture with friends, e.g., over a social network. Thus, a "take a pic" selector is shown on the UI 144, as well as a "share without a pic" selector. If the "take a pic" selector is selected, the application will, e.g., open a camera application for a camera on the device 112 or otherwise initiate a camera function associated with the device 112 so that the user can a picture using the device 112 and share the picture over, e.g., a social network, email, pix message, etc. If the "share without pic" selector is selected, the application may, e.g., cause another UI to be presented allowing a user to input text, which the application may then share over a social networking site, email, test message, etc. Alternatively or in addition, selection of the "share without pic" selector may cause a social networking application on the device 112 to be launched so that the user can share information that way.

Now in reference to FIG. 19, it is to be understood that a UI 146 may be presented on the device 112 after a challenge has been completed in addition to, or in lieu of, the UI 144. As may be appreciated from FIG. 19, the UI 146 includes, e.g., an indication of the user's rank based on the results of the challenge. In this case, the indication shows that the user of the device 112 is the winner of the challenge. The UI 146 also shows a picture that may have been taken, e.g., responsive to selection of the "take a pic" selector on the UI 144. The UI 146 thus also shows a "share challenge" selector that, when selected, causes the device to share the results and/or statistics of the challenge, and/or the picture shown on the UI 146, over, e.g., a social network, email, pix message, etc.

FIG. 20 shows a UI 148 that may be presented by the challenge application that integrates functions of the social networking site/application Instagram, or may alternatively be presented using another application such as the Instagram application itself. Regardless, it may be appreciated from FIG. 20 that the UI 148 includes various information that may be presented and shared with others responsive to selection of the "share challenge" selector from the UI 146. Thus, the time of the share, the location of the share, the picture taken after the challenge, the time it took to win the challenge, and/or the distance ran during the challenge, etc., may all be presented on the UI 148 and hence shared with others.

Figure 21:
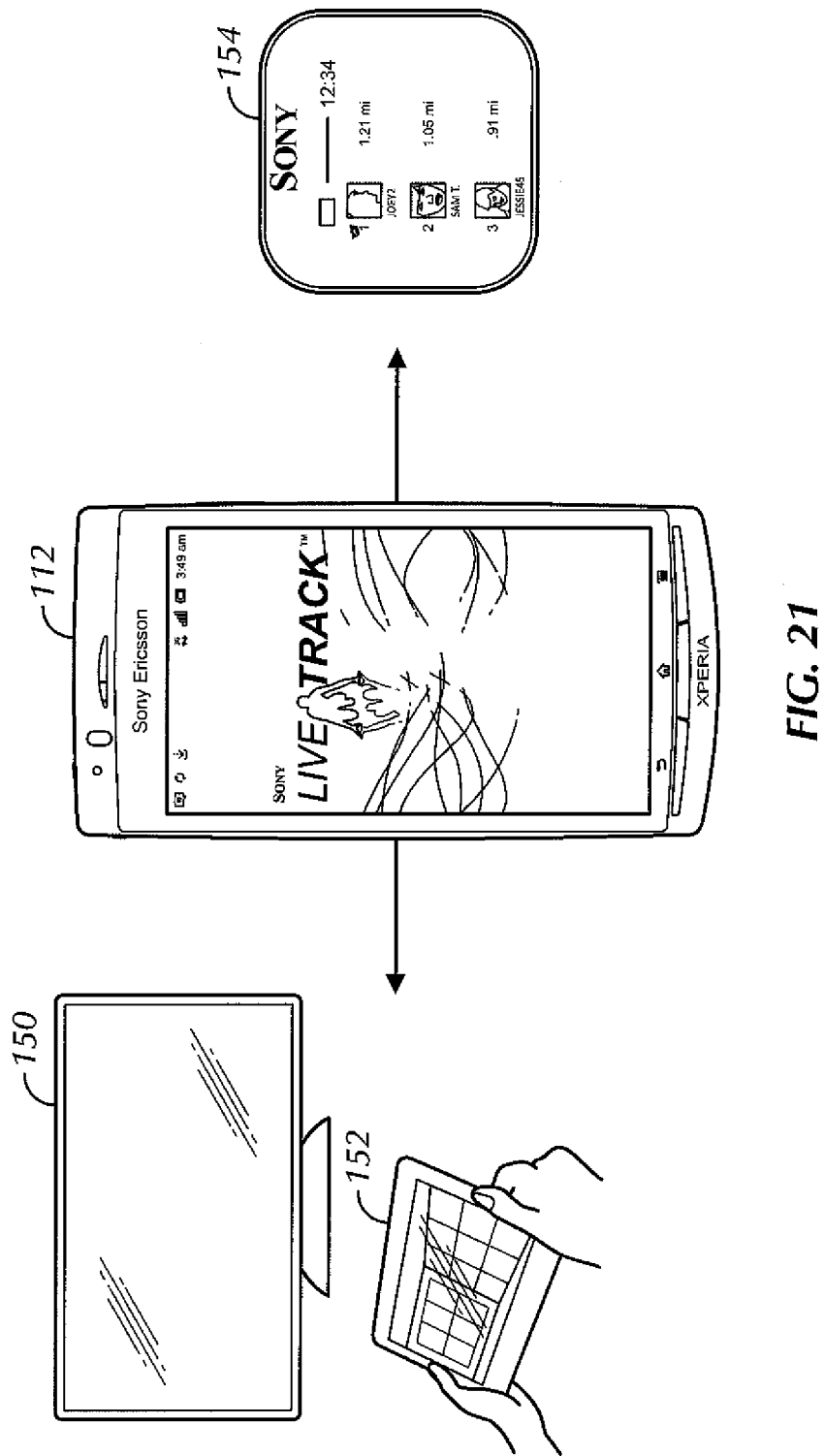
FIG. 21 is a block diagram of plural devices able to communicate with each other to exchange challenge information.

Continuing the detailed description in reference to FIG. 21, a block diagram of various consumer electronics devices communicating with each other to exchange challenge information from the device 112 is shown. Accordingly, the device 112 may share challenge information with a television such as, e.g., an Internet-enabled Sony Bravia TV 150 and/or a tablet computer 152 so that the information may be presented thereon. Note that still other devices may be used in conjunction with present principles, such as, e.g., Sony Playstation. Regardless, an exploded view 154 reflecting challenge information is also shown in FIG. 21, it being understood that the exploded view 154 provides perspective on the information that may be presented on either of the TV 150 or tablet computer 152.

Figure 22:
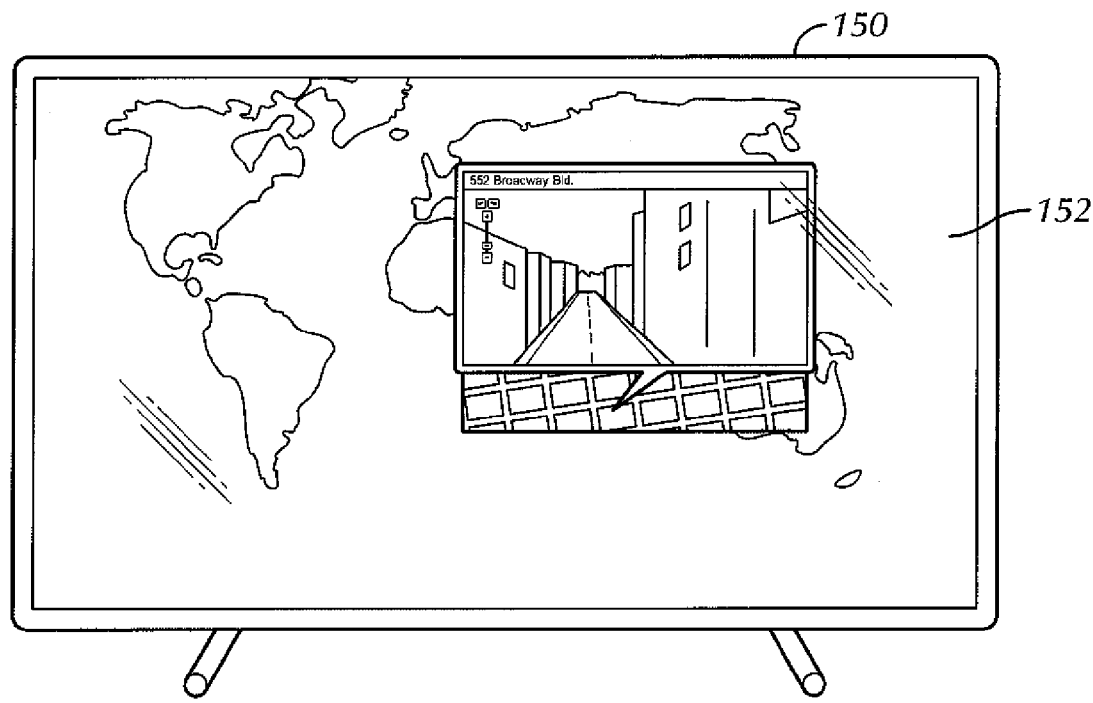
FIG. 22 is an exemplary screen shot that may be presented on a television in accordance with present principles.

FIG. 22 shows an exemplary screen shot 152 of additional information that may be presented on the TV 150. Accordingly, after the TV 150 receives the challenge information, a user may manipulate the TV 150 to present a map showing, e.g., the route taken by the participant, and/or the current location of the participant using, e.g., a Google maps application. Accordingly, note that the screen shot 152 includes a Google street view of the participant's current location (e.g., after winning the challenge) so that a viewer of the TV 150 may appreciate at least a portion of the area where the user participated in the challenge.

Figure 23:
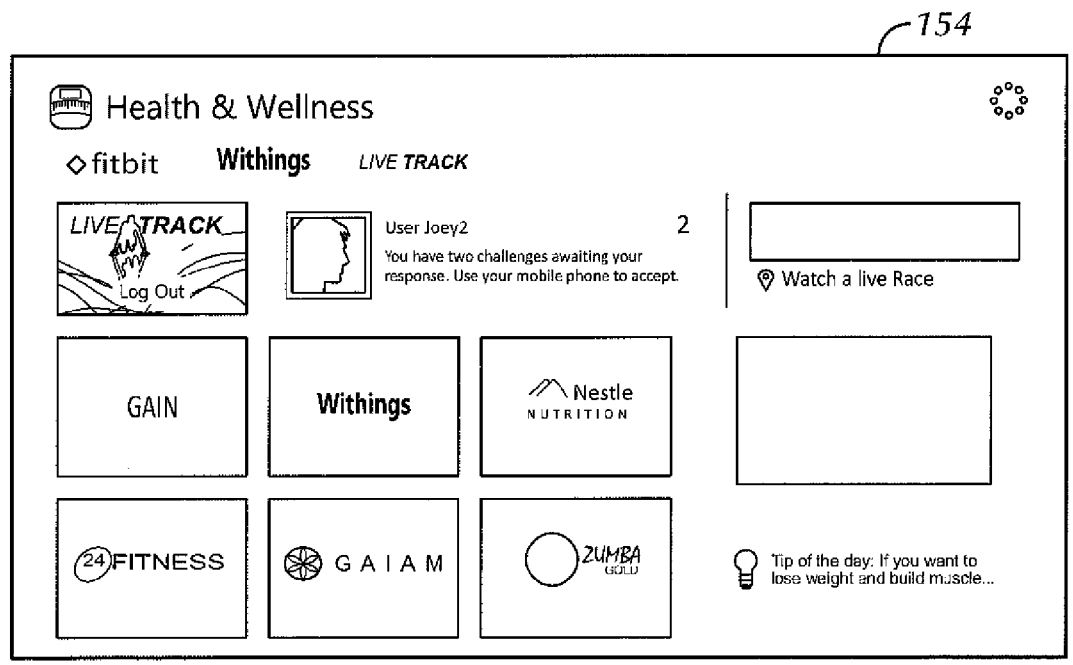
FIG. 23 is an exemplary health/wellness portal that may be implemented in accordance with present principles.

Concluding the detailed description in reference to FIG. 23, an exemplary health/wellness portal 154 that may be presented on a CE device is shown. Accordingly, the portal 154 may be presented on a mobile device executing the logic and application described above (e.g., the device 12 and/or the device 112), or may be presented on another CE device such as, e.g., a laptop computer or smart TV.

As shown, the portal 154 may, e.g., contain links to various health applications and sources of health information (e.g., websites). The portal 154 may also include indications of challenge requests that have been sent to a user of the portal 154. For example, as shown in FIG. 23, two "anytime" challenges have been sent to the user and are awaiting acceptance or denial. Furthermore, the portal may include instructions on how to accept or deny the challenges that the user has waiting, such as by, e.g., using a smartphone associated with the user that has a challenge application such as the one described above stored thereon. In addition to the foregoing, the portal 154 may also include a selector that, when selected, causes a map or other information for a challenge currently being participated in by other individuals and/or contacts of the user, even though the user is not participating in the challenge. A logout selector, as well as a "tip of the day" notification, may also be presented on the portal 154.

Based on the foregoing description, it may now be appreciated that individuals may compete in exercise challenges and/or competitions with each other even when not physically present in the same general location, and indeed when individuals are anywhere in the world (e.g., on different continents). Present principles also recognize the social benefits of such challenges. Accordingly, note that in addition to, e.g., participating in challenges with friends, a celebrity or other public figure may also use an application such as the one above such that fans may follow that celebrity's progress during or after an exercise and attempt to mimic it or unilaterally compete with the celebrity (e.g., the celebrity does not know if some one is competing against them, they are merely publicizing their exercise via the application, which a fan tries to match using challenge parameters matching the exercise of the celebrity).

It is to be further understood that other applications may function simultaneously on a mobile device with the challenge application described above. E.g., an iPhone may play music for a participant to listen to while participating in an exercise, or alternatively the challenge application itself may include software code to present music to a participant. Indeed, an automated voice may also report the participant's progress to the participant during the challenge using the challenge application as well (E.g., "You have ran half a mile so far at three miles per hour," or "Your first interval around the track was half a second faster than your second interval.") and in this respect incorporate personal trainer software code into the challenge application.

Additionally, the application may match music, recordings, and/or melodic beats to the steps of the participant during an exercise as sensed by the mobile device using, e.g., an accelerometer that provides signals via the device processor to the challenge application and/or music player. Note that accelerometer input may also be used by the challenge application to track and/or estimate a distance traveled for the purposes of participating in a challenge when, e.g., a participant is on a treadmill or exercise bike and thus does not actually change positions on earth (e.g., GPS coordinates) during a challenge.

Again discussing the emergency services and capabilities of the challenge application, also note that that such emergency services may include other functions as well. For instance, the services may alert not only a friend of a medical emergency experienced by the participant, but also may alert a 911 operator, the local fire department, the local police department, etc., and indeed those emergency services may be alerted in a particular order as determined by the participant until at least one response is received and/or an automated emergency call made by the challenge application is otherwise answered. Other modes of communication may also be used for emergency alerts as well, such as, e.g., text messaging, data transmittal to an emergency 911 database, email, etc. Furthermore, present principles recognize that the emergency notification capabilities of the challenge application may include the ability to receive a signal representing a keyword or command spoken into the mobile device by the participant to initiate and transmit an emergency alert to, e.g., 911. Other user-input may be, e.g., simply blowing into the mobile device (e.g., into a microphone) to trigger an alert that may have been preset.

Even further, the emergency capabilities of the challenge application may cause the participant to be alerted of emergencies in the area where the participant is engaging in a challenge or simply using the application while exercising (e.g., safety mode only). For example, there may be an impending natural disaster about which the participant may be alerted, a traffic jam, a house fire, a tornado or sudden thunderstorm, etc. It is to be understood that the challenge application is therefore able to access at least one database (e.g., a national weather service database or a signal alert database) to gather such information and present it to the participant.

In addition, the challenge application may also incorporate various features for travel purposes as well. For instance, the application may be able to track road trips, vacations including flights that are taken, etc. It may also present information about the locations being visited as well as a specialized greeting based on the location visited that is presented upon power on of the device or display lighting.

Last, note that cloud computing/technology may also be used in accordance with present principles. For example, the "cloud" may be used to upload a participant's results, challenge statistics, and any pictures taken such that they are later accessible by the participant from, e.g., the participant's laptop computer.

While the particular USER DEVICE POSITION INDICATION FOR SECURITY AND DISTRIBUTED RACE CHALLENGES is herein shown and described in detail, it is to be understood that the subject matter which is encompassed by the present invention is limited only by the claims.

What is claimed is:

1. A mobile computing device comprising:
   a processor configured to receive position information from a position sensor;
   a display configured to be controlled by the processor;

a computer readable storage medium accessible to the processor and bearing instructions which when executed by the processor cause the processor to:

receive user input to challenge at least one friend's user device to an exercise;

upload the challenge to a server;

receive a signal from the server indicating the challenge is accepted;

at a predetermined start time, upload to the server position information from the position sensor;

receive from the server map information presenting a position of the mobile device and a position of the at least one friend's user device; and periodically during the exercise, receive updates of the map information including updates of the position of the mobile device and the position of the at least one friend's user device;

wherein at least one position received from the server is a race position that represents a true position as received from a position sensor adjusted for an elevation change of the user or an elevation change of the at least one friend's user device between successive true positions uploaded to the server, wherein responsive to a determination that the user has traversed an elevation gain between reported true positions, a distance is added to a true distance traveled determined from true positions to render a race position, and the map information indicates the race position.

2. The device of claim 1, wherein the positions received from the server are true positions as indicated by the position sensor inputting signals to the processor and a position sensor associated with the at least one friend's user device.

3. The device of claim 1, wherein the processor causes a user interface (UI) to be presented on the display presenting the map information.

4. The device of claim 1, wherein the computer readable storage medium also bears instructions that when executed by the processor cause the processor to transmit an emergency alert to a predetermined destination based on at least one emergency criteria being met as determined by the processor.

5. A mobile computing device comprising:

a processor configured to receive position information from a position sensor;

a display configured to be controlled by the processor;

a computer readable storage medium accessible to the processor and bearing instructions which when executed by the processor cause the processor to:

receive user input to challenge at least one friend's user device to an exercise;

upload the challenge to a server;

receive a signal from the server indicating the challenge is accepted;

at a predetermined start time, upload to the server position information from the position sensor;

receive from the server map information presenting a position of the mobile device and a position of the at least one friend's user device; and periodically during the exercise, receive updates of the map information including updates of the position of the mobile device and the position of the at least one friend's user device;

wherein at least one position received from the server is a race position that represents a true position as received from a position sensor adjusted for an elevation change of the user or an elevation change of the at least one friend's user device between successive true positions uploaded to the server, wherein responsive to a determination that the user has traversed an elevation loss between reported true positions, a distance is subtracted from a true distance traveled determined from true positions to render a race position, and the map information indicates the race position.

6. A mobile computing device comprising:

a processor configured to receive position information from a position sensor;

a display configured to be controlled by the processor;

a computer readable storage medium accessible to the processor and bearing instructions which when executed by the processor configure the processor to:

receive user input to challenge at least one friend's user device to an exercise;

upload the challenge to a server;

receive a signal from the server indicating the challenge is accepted;

at a predetermined start time, upload to the server position information from the position sensor;

receive from the server map information presenting a position of the mobile device and a position of the at least one friend's user device; and periodically during the exercise, receive updates of the map information including updates of the position of the mobile device and the position of the at least one friend's user device, wherein the instructions when executed by the processor configure the processor to receive user input to challenge the at least one friend's user device to an exercise based on selection of one of plural challenge mode selector elements on a UI, the instructions when executed by the processor configuring the processor to present the UI on the display under control of the processor, wherein the challenge mode selector elements include at least a live challenge selector element and an anytime challenge selector element.

7. A server, comprising:

a processor;

a computer readable storage medium accessible to the processor and bearing instructions which when executed by the processor cause the processor to:

receive a request for an exercise competition from a first consumer electronics (CE) device;

send the request to a second CE device for acceptance of the request by the second CE device, receive a signal from the second CE device indicating the acceptance of the request;

provide notification of the acceptance to the first CE device;

after providing notification of the acceptance to the first CE device, receive at least position data from both the first and second CE devices at a predetermined start time, the position data including at least an initial position of each of the first and second CE devices;

based on the position data received, render a position map of the positions of both the first and second CE devices and provide the position map to both the first and second CE devices;

update the position map during the competition based on position updates received from the first and second CE devices and provide the updated position map to the first and second CE devices showing one or more previous positions and the updated positions of the first and second CE devices;

determine respective routes of the first and second CE devices based on the position data from the first and second CE devices;

apply the routes to at least one topographical map stored in a database associated with the server;

determine respective changes in elevation of the first and second CE devices based on the routes as applied to the topographical map.

8. The server of 7, wherein the instructions when executed by the processor configure the processor to initiate a timer to track the length of the competition.

9. The server of claim 7, wherein the instructions when executed by the processor configure the processor to receive signals from the first and second CE devices representative of changes in elevation of the first and second CE devices during the competition.

10. The server of 7, wherein the server adjusts the positions of the first and second CE devices on the position map based on a change in elevation of the first or second CE devices and provides the adjusted position map to the first and second CE devices, wherein the position map is adjusted such that if one of the CE devices has traversed an elevation gain between true positions of the CE device determined based on the position data received therefrom, a distance is added to a true distance traveled determined from the true positions to render a race position that is reflected on the position map, and if one of the CE devices has traversed an elevation loss between true positions of the CE device determined based on the position data received therefrom, a distance is subtracted from a true distance traveled determined from the true positions to render a race position that is reflected on the position map, the position map indicating the race positions of the CE devices.

11. The server of claim 7, wherein the instructions when executed by the processor configure the processor to determine a winner of the competition based on at least one parameter input to one of the first or second CE devices and provided to the server by the first or second CE device, the instructions when executed by the processor configuring the processor to provide notification of the winner to the first and second CE devices for presentation thereon after performing the determination of the winner.

* * * * *